(12) United States Patent
Kamata et al.

(10) Patent No.: US 8,155,451 B2
(45) Date of Patent: Apr. 10, 2012

(54) MATCHING APPARATUS, IMAGE SEARCH SYSTEM, AND HISTOGRAM APPROXIMATE RESTORING UNIT, AND MATCHING METHOD, IMAGE SEARCH METHOD, AND HISTOGRAM APPROXIMATE RESTORING METHOD

(75) Inventors: Seiichiro Kamata, Kitakyushu (JP); Kazuyuki Tsuneyoshi, Kitakyushu (JP)

(73) Assignees: Kitakyushu Foundation for the Advancement of Industry, Science and Technology, Fukuoka (JP); Waseda University, Tokyo (JP)

( * ) Notice: Subject to any disclaimer, the term of this patent is extended or adjusted under 35 U.S.C. 154(b) by 1369 days.

(21) Appl. No.: 11/667,565

(22) PCT Filed: Nov. 8, 2005

(86) PCT No.: PCT/JP2005/020471
§ 371 (c)(1),
(2), (4) Date: May 11, 2007

(87) PCT Pub. No.: WO2006/051792
PCT Pub. Date: May 18, 2006

(65) Prior Publication Data
US 2008/0205756 A1 Aug. 28, 2008

(30) Foreign Application Priority Data
Nov. 12, 2004 (JP) .................................. 2004-329231
Mar. 17, 2005 (JP) .................................. 2005-078260

(51) Int. Cl.
*G06K 9/62* (2006.01)

(52) U.S. Cl. ....................................................... 382/209
(58) Field of Classification Search ........................ None
See application file for complete search history.

(56) References Cited

U.S. PATENT DOCUMENTS
5,991,430 A * 11/1999 Hsu et al. ...................... 382/124
(Continued)

FOREIGN PATENT DOCUMENTS
JP    10-508727    *   8/1998
(Continued)

OTHER PUBLICATIONS
Kamata, Sei-ichiro; Niimi, Michiharu; Kawaguchi, Eiji. "A Gray Image Compression Using a Hilbert Scan". IEEE. Proceedings of ICPR '06. pp. 905-909. 2006.*
(Continued)

*Primary Examiner* — Samir Ahmed
*Assistant Examiner* — Fred Hu
(74) *Attorney, Agent, or Firm* — Edwards Wildman Palmer LLP

(57) ABSTRACT

A matching apparatus and method compares a set of feature points of two objects projected to an N-dimensional space and determines the similarity between the objects and includes mapping the set to a one-dimensional space, creating a set of pairs of a feature point of first object that is the most approximate to a feature point of second object, partly extracting the pairs in small order of the pair distance from the set of the pairs of the feature points and creating a partial set of the pairs of the feature points, calculating a rating-scale of the pair belonging to the partial set of the pair of the feature points, and determining the similarity between the first object and the second object on the basis of an average value of the distance.

16 Claims, 17 Drawing Sheets

U.S. PATENT DOCUMENTS

| | | | | |
|---|---|---|---|---|
| 6,163,622 | A | * | 12/2000 | Abdel-Mottaleb et al. ... 382/170 |
| 6,922,487 | B2 | * | 7/2005 | Dance et al. ................. 382/190 |

FOREIGN PATENT DOCUMENTS

| | | | |
|---|---|---|---|
| JP | 2000-187731 | * | 7/2000 |
| JP | 2001-101411 | * | 4/2001 |
| JP | 2001-109885 | | 4/2001 |
| JP | 2002-150287 | | 5/2002 |
| JP | 2002-524789 | * | 8/2002 |
| JP | 2004-294755 | | 10/2004 |
| JP | 2004/312693 | | 11/2004 |
| JP | 2005-25465 | | 1/2005 |
| WO | 03/036564 | * | 5/2003 |

OTHER PUBLICATIONS

M. Kobayashi et al., "Lossless Compression Method for Color Document Images," The Transactions of the Institute of Electronics, Information and Communication Engineers, vol. J85-D-II, No. 4, Apr. 2002, pp. 584-593, Cited in the International Search Report.*

S. Kamata, "Space Filling Curve and its Application to Image Compression," Information Processing Society of Japan Kenkyu Hokoku, vol. 99, No. 82, Oct. 8, 1999, pp. 1-6. / Cited in the International Search Report.*

S. Kamata, "A Study on Data Compression for Gray Images Using a Hilbert Scan," vol. J80-D-II, No. 2. Feb. 1997, pp. 426-433, / discussed in the specification.

* cited by examiner (a) data image (b) query image
(reference object)

(a)

(b)

length L (N point)

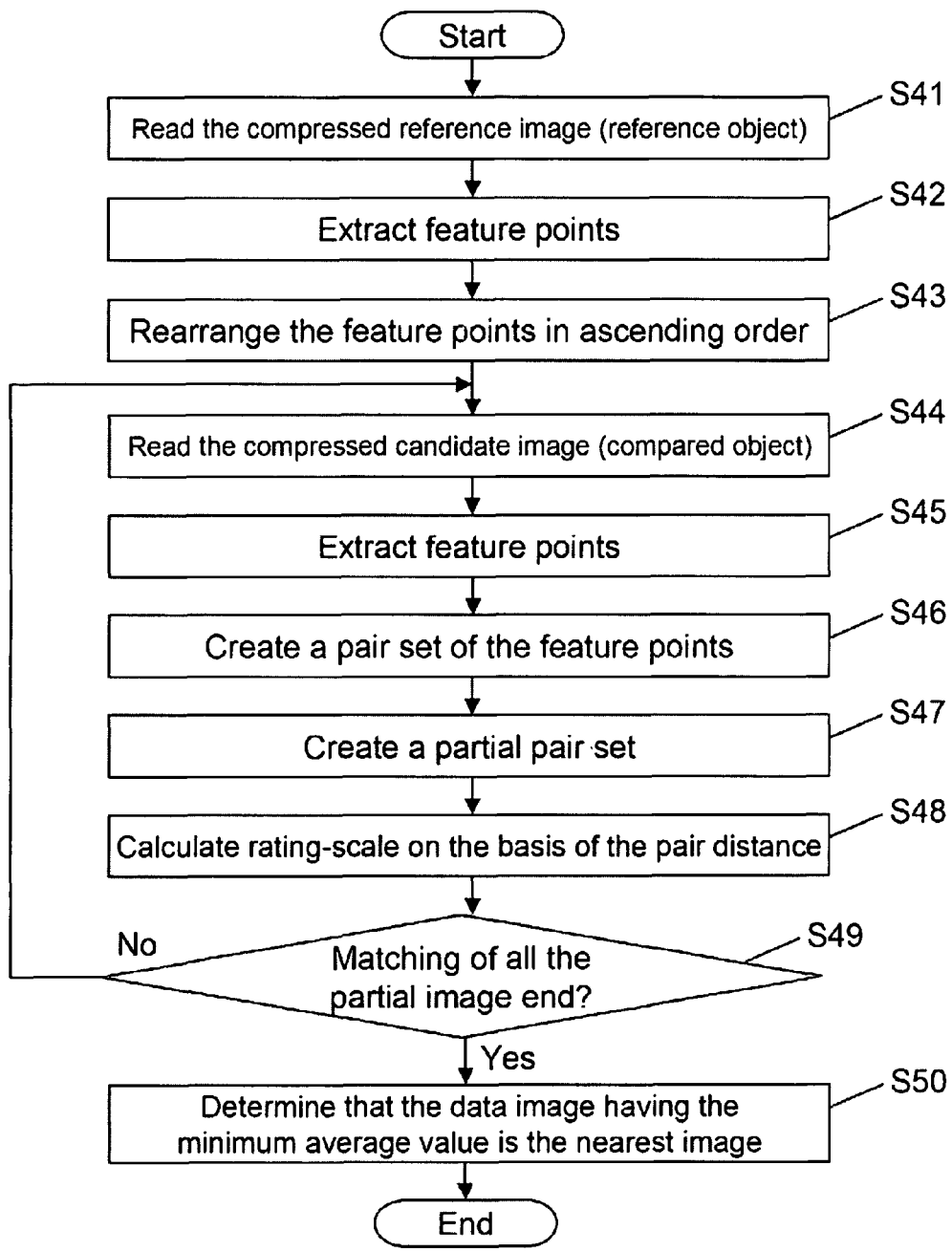

MATCHING APPARATUS, IMAGE SEARCH SYSTEM, AND HISTOGRAM APPROXIMATE RESTORING UNIT, AND MATCHING METHOD, IMAGE SEARCH METHOD, AND HISTOGRAM APPROXIMATE RESTORING METHOD

This application is being cross referenced with application titled MATCHING APPARATUS, IMAGE SEARCH SYSTEM, AND HISTOGRAM APPROXIMATE RESTORING UNIT, AND MATCHING METHOD, IMAGE SEARCH METHOD, AND HISTOGRAM APPROXIMATE RESTORING METHOD based on PCT/JP2005/020471 filed on even date herewith.

TECHNICAL FIELD

The present invention relates to a matching technology for determining the similarity of two objects and an image search technology applying it.

BACKGROUND ART

Data having a common purpose is called an "object". In general, the object comprises a large number of pieces of data, e.g., a still image, a motion image, sound, and a document. In an information search field, such a matching technology is greatly important that two objects are compared with each other and the similarity therebetween is compared and is determined. The matching technology is applied to various fields including an image search, speech search, and document search.

As a conventional matching technology, e.g., technologies disclosed in Patent Documents 1 to 4 are well-known.

According to a matching method disclosed in Patent Document 1, a set of all feature points of one image is compared with a set of all feature points of another image and, then, when both the sets are similar to each other, it is determined that one image is similar to the other image.

With a speaker identifying apparatus disclosed in Patent Document 2, such matching processing is performed that a speech generated by a speaker is spectrum-analyzed and the thus-obtained amount of features is compared with the amount of features registered to a database to identify the speaker.

Further, with a document search method disclosed in Patent Document 3, such matching processing is performed that the appearance frequency of an index term appearing in a document is determined as the amount of features of the document and the document is searched.

With the above-mentioned conventional matching methods, a relatively small amount of features is extracted from an object serving as a matching target, and the similarities of the amount of features are compared with each other. Therefore, a number of variables used is small, calculation processing is simple, and fast processing is possible.

In an information search field, the fast matching processing is required and the matching precision is also needed. The improvement of the matching precision requires the increase in number of feature points and the setting of the amount of features as a high-dimensional vector as much as possible. However, if increasing the number of feature points and the number of dimensions, the calculation processing becomes complicated and this cannot respond to the requirement of the fast processing.

Then, with a matching method disclosed in Patent Document 4, upon displaying "the amount of features of an image" by a mapping point that is mapped on N-dimensional space, element points in two images are mapped to a space filling curve for filling the N-dimensional space, and are further mapped to the one-dimensional space, and the similarities between the two images are estimated by the distance between the two mapped points.

The "amount of features of the image" used for the matching method is a histogram of an image created by using 600 different color bins. That is, with the matching method, the combination of the number of pixels corresponding to the 600 different colors is set as the "amount of features of the image", and 600-dimensional space is assumed. Further, the number of pixels of colors of the histogram corresponds to the coordinates on the 600-dimensional space, and the histogram (i.e., the "amount of features of the image") is displayed as the point on the 600-dimensional space. Furthermore, the point is mapped on the space filling curve for filling the 600-dimensional space, thereby mapping the point to the one-dimensional space.

[Patent Document 1]
Japanese Unexamined Patent Application Publication No. 2001-109885
[Patent Document 2]
Japanese Unexamined Patent Application Publication No. 2004-294755
[Patent Document 3]
Japanese Unexamined Patent Application Publication No. 2005-025465
[Patent Document 4]
PCT Japanese Translation Patent Publication No. 2002-524789
[Patent Document 5]
Japanese Unexamined Patent Application Publication No. 2002-150287
[Patent Document 6]
Japanese Unexamined Patent Application Publication No. 2004-312693
[Non-Patent Document 1]
Seichiro KAMATA, February 1997, "View on Information Compression of Grayscale Image Using Hirbert Scanning", Journal of Institute of Electronics, Information and Communication Engineers, Vol. J80-D-II, No. 2, pp. 426-433

DISCLOSURE OF INVENTION

Problems to be Solved by the Invention

As mentioned above, with the matching method disclosed in Patent Document 4, the feature point on the N-dimensional space is mapped on the one-dimensional space, and the similarity between two images mapped on the one-dimensional space is estimated by using the distance between feature points of the two images. Therefore, the similarity can be easily estimated. This uses such a nature that points existing closely on a space filling curve also exist closely on the original space.

However, points existing closely even on the original space do not necessarily closely exist on the space filling curve. That is, even if the feature points of the two images exist closely on the original 600-dimensional space, the feature points are mapped on the one-dimensional space and the distance therebetween then increases. Thus, the similarity can be estimated to be low and an image to be originally extracted as a similar image cannot be extracted. With the matching method disclosed in Patent Document 4, it is easily considered that high matching precision cannot necessarily be obtained.

Then, it is one object of the present invention to provide a matching technology for determining the similarity between two objects with high precision and at high speed.

Further, it is another object of the present invention to provide an image search technology for searching for an image with high precision and at high speed by applying the matching technology of the objects.

Further, it is another object of the present invention to provide an image search technology used for coarse search of an image serving as pre-processing of the image search apparatus and a pixel-value histogram approximation restoring technology used therefor.

Means for Solving the Problem

With a first structure of a matching apparatus according to the present invention, the matching apparatus for comparing a reference object with a compared object and determining the similarity between both the objects, comprises:

mapping means that maps feature points extracted from the objects to a one-dimensional space by bijection for developing data elements of the objects on the one-dimensional space;

pairing means that searches for the feature point of the compared object existing the most nearest to the feature point of the reference object on the one-dimensional space and creates a set (hereinafter, referred to as a "pair set") of pairs of the feature point of the reference object and the feature points of the compared object;

pair extracting means that creates a partial pair set obtained by partly extracting the pairs from the pair set in small order of the distance (hereinafter, referred to as "pair-distance") between the feature points forming the pair;

rating-scale calculating means that calculates a rating scale between the reference object and the compared object on the basis of the pair distance of the pair belonging to the partial pair set; and determining means that determines the similarity between the reference object and the compared object on the basis of the rating scale.

With this structure, only the pair having a small pair distance is extracted from the pair set of the feature points, the partial pair set of the feature points is created, and the rating scale is calculated on the basis of the pair distance of the pair belonging to the partial pair set. As a consequence, the influence of an exceptional pair having a far distance, in particular, the pair that has a close distance on the original object space and is however mapped at a far distance thereof with the bijection by the mapping means is excluded, thereby enabling the increase in correlation between the rating scale and the similarity between both the objects.

Herein, the "object" indicates data having a common purpose. For example, the object includes content such as a still image, a motion image, a speech, and a document.

The "rating scale" indicates the distance or similarity serving as the rating reference of the similarity between the reference object and the compared object. The rating scale includes an average value of the pair distance of the pair belonging to the partial pair set, and a value obtained by multiplying a weight proportional to a ratio of the number of pairs of the partial pair set to the total number of pairs to the average of the pair distance of the pair belonging to the partial pair set.

The determination of the "similarity" by the determining means includes, e.g., the determination of a threshold of the rating scale, and the comparison and determination of the rating scale of a plurality of compared objects.

Further, with the first structure, the pair extracting means can create the partial pair set obtained by extracting a predetermined number of pairs from the pair set in small order of the pair distance. In this case, the pair at the end of the large pair distance on the distribution of the pair distances is not estimated in the calculation of the rating scale. Therefore, from among corresponding data elements between both the objects, the influence, to the rating scale, of the pair of the data elements that is apart from each other due to the bijection is suppressed.

Preferably, in this case, the number of pairs of the feature points forming the partial pair set may be 50% of the total number of pairs of feature points forming the pair set.

Furthermore, with the first structure, the pair extracting means can create the partial pair set obtained by extracting the pair having the pair distance not more than a predetermined threshold from the pair set. In this case, the pair having the pair distance over a predetermined threshold is assumed as a pair of the data elements apart from each other due to the bijection, and is not used for the calculation of the rating scale. As a consequence, the correlation between the similarity between both the objects and the rating scale can increase.

With a second structure of the matching apparatus according to the present invention with the first structure, the pair extracting means creates a partial pair set obtained by extracting the pair having the pair distance not more than a predetermined threshold from the pair set, and the rating-scale calculating means calculates a sum S1 of the pair distance of the pair belonging to the partial pair set, further calculates a value S2 obtained by multiplying a predetermined weight value to the number of pairs non-belonging to the partial pair set, and divides a sum S1+S2 of the sum S1 and the value S2 by the total number of pairs in the pair set, thereby calculating the rating scale.

In this case, the pair having the pair distance over a predetermined threshold is assumed as a pair (hereinafter, referred to as a "discrete pair") of data elements apart from each other due to the bijection, and the pair distance is not used for the calculation of the rating scale. However, the ratio of the discrete pair shared to all pairs is used for the calculation of the rating scale as the value S2 obtained by multiplying a predetermined weight value to the number of discrete pairs. That is, by properly adjusting the weight value, as the ratio of discrete pairs is larger, the similarity between both the objects is estimated to be low, and the correlation between the rating scale and the similarity between both the objects can increase.

Herein, the "weight value" according to the present invention is not specified. However, preferably, the "predetermined threshold" used for extracting the pair by the pair extracting means is usually used. Because the "predetermined threshold" is rational to be used as the weight value, serving as the upper limit of the pair distance of the pair belonging to the partial pair set, used for the increase in correlation between the rating scale and the similarity between both the objects.

With a third structure of the matching apparatus according to the present invention with the first or second structure, the mapping means maps the feature point on a space filling curve passing through all data elements of the objects.

The map using the space filling curve has a correlation between the distance of two points on the original space and the distance of the two points after the mapping. Therefore, with this structure, the correlation between the average value of the distances and the similarity between both the objects can increase. Incidentally, it is well-known that the space filling curve includes Hilbert curve, Sierpinski curve, and Peano curve.

With a fourth structure of the matching apparatus according to the present invention with the third structure, the space filling curve is Hilbert curve.

All bending angles of the Hilbert curve are right angles. Therefore, the Hilbert curve is suitable for filling a square space such as a two-dimensional image.

With a fifth structure of the matching apparatus according to the present invention with one of the first to fourth structures, the object is an image.

With this structure, the images are compared on the basis of a small number of feature points of the image having a large number of pixels (data elements), thereby increasing the speed for comparing the images.

With a sixth structure of the matching apparatus according to the present invention with the fifth structure, the feature point is an edge point.

The edge point is more easily detected, as compared with another feature point. Therefore, with this structure, the images can be stably compared without fail.

With a first structure of a histogram approximate restoring unit according to the present invention, a pixel value of a pixel of original image data is quantized and is run-length encoded, thereby obtaining image data (hereinafter, referred to as "compressed image data") of a compressed image. Then, the histogram approximate restoring unit approximately restores a histogram of pixel values of the original image from the above-compressed image data. The histogram approximate restoring unit comprises:

discrete-histogram creating means that creates discrete histogram data by calculating a total $L_i$ (hereinafter, referred to as a "degree of pixel value") of run lengths corresponding to a pixel value at the entire region or a specific partial region of the compressed image data from among a pixel value $C_i$ ($i=1, 2, \ldots, M$; where M is a number of all pixel values included in the compressed image data) of the compressed image data stored in the compressed image storing means; and approximate-histogram creating means that creates approximate histogram data approximately expressing the appearance frequency of the pixel value of the original image data by distributing the degree $L_i$ of the pixel value of the discrete histogram data corresponding to the pixel value $C_i$ ($i=1, 2, \ldots, M$) of the compressed image data to a degree $L(x)$ of a pixel value x close to the pixel value $C_i$ so as to obtain a normal distribution having a standard deviation a with the pixel value $C_i$ as center.

With this structure, the discrete-histogram creating means calculates the degree $L_i$ of the pixel value to the pixel value $C_i$ of the compressed image data, thereby calculating the histogram (discrete histogram data) of the pixel value at the entire region or specific partial region of the compressed image data without restoring the compressed image data. That is, the discrete histogram data can be reproduced fast from the compressed image data because decoding operation is not performed. Further, the approximate-histogram creating means performs the distribution of the discrete histogram data having a discrete degree of pixel value for the pixel values, thereby converting the data into approximate histogram data having the continuous degree of pixel values for the pixel values. Thus, the histogram data approximate to the original image data can be restored.

With a second structure of the histogram approximate restoring unit according to the present invention with the first structure, the approximate-histogram creating means creates the approximate histogram data by distributing a degree $L_i$ ($i=1, 2, \ldots, M$) of the degree of pixel value of the discrete histogram data $\{(C_i, L_i)|i=1, 2, \ldots, M\}$ to a degree $L(x)$ of the pixel value of a pixel value x approximate to the pixel value $C_i$ so as to obtain a normal distribution expressed by a normal-distribution function $G(x)$ in (Expression 1).

$$G(x) = \frac{L_i}{\sqrt{2\pi}\,\sigma} \exp\left(-\frac{(x-C_i)^2}{2\sigma^2}\right) \qquad \text{[Expression 1]}$$

With this structure, the normal-distribution function $G(x)$ is a function of the pixel value $C_i$ of the discrete histogram data $\{(C_i, L_i)|i=1, 2, \ldots, M\}$, the degree $L_i$ of pixel value, and the standard deviation σ. Therefore, only by assuming the standard deviation σ, the histogram data approximate to the original image data can be restored.

With a third structure of the histogram approximate restoring unit according to the present invention with the first or second structure, the approximate-histogram creating means creates approximate histogram data approximately expressing the appearance frequency of the pixel value of the original image data by distributing a degree $L_i$ of the pixel value of the discrete histogram data corresponding to the pixel value $C_i$ ($i=1, 2, \ldots, M$) of the compressed image data to the degree $L(x)$ of the pixel value of the pixel value x approximate to the pixel value $C_i$ so as obtain a normal distribution having a standard deviation $\sigma = C_i/4$ with the pixel value $C_i$ as center.

With this structure, since the value of the standard deviation σ is $C_i/4$, the normal distribution can be uniquely determined from the discrete histogram data $\{(C_i, L_i)|i=1, 2, \ldots, M\}$. As a consequence, the histogram data can be further fast restored.

With a fourth structure of the histogram approximate restoring unit according to the present invention with the first or second structure, the compressed image data is run-length encoded by quantizing the pixel value of the pixel of the original image data and determining the run-length so that the distribution of pixel values of the original image data corresponding to run is not more than a predetermined threshold Γ, and the approximate-histogram creating means creates approximate histogram data approximately expressing the appearance frequency of the pixel value of the original image data by distributing the degree $L_i$ of pixel value of the discrete histogram data corresponding to the pixel value $C_i$ ($i=1, 2, \ldots, M$) of the compressed image data to the degree $L(x)$ of pixel values of the pixel value x approximate to the pixel value $C_i$ so as to obtain a normal distribution of a standard deviation $\sigma = \Gamma^{1/2}$ with the pixel value $C_i$ as center.

With this structure, a square root of a threshold Γ of the distribution of pixel values of the original image data corresponding to the run is set as a value of the standard deviation σ. Therefore, an estimation value of the standard deviation σ is obtained with high precision, and the precision for approximately restoring the histogram data is improved.

With a fifth structure of the histogram approximate restoring unit according to the present invention with the first or second structure, the compressed image data is run-length encoded by quantizing the pixel value of the pixel of the original image data and determining the run length so that the distribution of the pixel values of the original image data corresponding to the run is not more than a threshold Γ, and the approximate-histogram creating means creates the standard deviation σ that is a small one of square roots of $C_i/4$ and the threshold Γ.

With this structure, the value of the standard deviation σ is a small one f square root of $C_i/4$ and the threshold Γ. Therefore, the excessive estimation of the value of the standard deviation σ can be prevented. As a consequence, the precision for approximately restoring the histogram data is improved.

With a first structure of an image search system according to the present invention, the image search system comprises:

an image database that stores a plurality of pieces of image data (hereinafter, referred to as "compressed image data") of a compressed image obtained by quantizing and run-length encoding pixel values of pixels of original image data; and reference-histogram storing means that stores pixel value histogram data (hereinafter, referred to as "reference histogram data") of a reference image. The image search system searches for the compressed image data stored in the image database that is similar to the reference image from among the compressed image data, and comprises:

discrete-histogram creating means that creates discrete histogram data by calculating a total $L_i$ (hereinafter, referred to as a "degree of pixel value") of run lengths corresponding to a pixel value $C_i$ (i=1, 2, ..., M; where M is a total number of pixel values included in the compressed image data) of the compressed image data stored in the image database, at the entire region or a specific partial region of the compressed image data from among the pixel values;

approximate-histogram creating means that creates approximate histogram data approximately expressing the appearance frequency of the pixel value of the original image data by distributing the degree $L_i$ of pixel value of the discrete histogram data corresponding to the pixel value $C_i$ (i=1, 2, ..., M) of the compressed image data to a degree $L(x)$ of pixel value of a pixel value x approximate to the pixel value $C_i$ so as to have a normal distribution of a standard deviation a with the pixel value $C_i$ as center;

similarity calculating means that calculates the similarity between the approximate histogram data and the reference histogram data stored in the reference-histogram storing means; and image selecting means that selects one or a plurality of the image compressed data similar to the reference image on the basis of the similarity of the compressed image data.

With this structure, the discrete-histogram creating means calculates the degree $L_i$ of pixel value of the pixel value $C_i$ of the compressed image data, thereby calculating a histogram (discrete histogram data) of the pixel value at the entire region or the specific partial region of the compressed image data without restoring the compressed image data. That is, the discrete histogram data can be reproduced fast from the reference histogram data and the compressed image data. Further, the approximate-histogram creating means distributes the discrete histogram data having a discrete degree of pixel values, and converts the distributed data into approximate histogram data having a continuous degree of pixel values. Furthermore, the similarity between the approximate histogram data and the reference histogram data is calculated. As a consequence, the histogram data is restored approximately to the original image data without restoring the compressed image data, and the similarity to the reference histogram data is calculated. Thus, the image search of the compressed image data can be fast.

With a second structure of the image search system according to the present invention with the first structure, the similarity calculating means calculates the difference between the approximate histogram data and the reference histogram data as the similarity.

With this structure, the similarity calculating means calculates the difference between the approximate histogram data and the reference histogram data as the similarity. As a consequence, the similarity can be simply calculated and the time required for the image search can be further reduced.

With a third structure of the image search system according to the present invention, the image search system with the first or second structure further comprises:

first feature-point extracting means that sets one or a plurality of the compressed image data selected by the image selecting means as the compressed image data of a candidate image, extracts a feature point of the candidate image on the basis of the compressed image data of the candidate image, and calculates the coordinates of the feature point on the one-dimensional space;

second feature-point extracting means that extracts a feature point of the reference image and calculates the coordinates of the feature point on the one-dimensional space;

pairing means that searches for a feature point of the candidate image that is the most approximate to the feature point of the reference image on the one-dimensional space, and creates a set (hereinafter, referred to as a "set of pairs") of pairs of the feature point of the reference image and of the feature point of the candidate image;

pair extracting means that creates a partial pair set obtained by extracting a part of the pairs in small order of the distance (hereinafter, referred to as a "pair-distance") between both the feature points of the pair from among the pair set;

rating-scale calculating means that calculates a rating scale between the reference image and the candidate image on the basis of the pair-distance of the pair belonging to the partial pair set; and determining means that determines the similarity between the reference image and the candidate image on the basis of the rating scale.

With this structure, the candidate images similar to the reference image are narrowed to some degree by the image search using the comparison between the histograms, and the images are strictly compared with each other with matching using the extraction of feature point, thereby enabling the image search with high speed and high precision. Further, the amount of calculation and the calculation time can be reduced without decoding the compressed image.

A matching method according to the present invention for comparing a reference object with a compared object and determining the similarity between both the objects, comprises:

a mapping step of mapping a feature point extracted from the objects by bijection for developing data elements of the objects on a one-dimensional space to the one-dimensional space;

a pairing step of searching for a feature point of the compared object that is the most approximate to a feature point of the reference object on the one-dimensional space, and creating a pair set of the feature point (hereinafter, referred to as a "pair set") of the reference object and the feature point of the compared object;

a pair extracting step of creating a partial pair set obtained by extracting a part of the pairs in small order of the distance (hereinafter, referred to as a "pair-distance") between both the feature points of the pair from among the pair set;

a rating-scale calculating step of calculating a rating scale between the reference image and the candidate image on the basis of the pair-distance of the pair belonging to the partial pair set; and a determining step of determining the similarity between the reference image and the candidate image on the basis of the rating scale.

A histogram approximate restoring method according to the present invention for approximately restoring a histogram of pixel values of an original image from image data (hereinafter, referred to as "compressed image data") of a compressed image obtained by quantizing and run-length encoding pixel values of pixels of data on the original image comprises:

a discrete-histogram creating step of creating discrete histogram data by calculating a total $L_i$ (hereinafter, referred to as a "degree of pixel value") of run lengths corresponding to a pixel value at the entire region or a specific partial region of the compressed image data from among a pixel value $C_i$ (i=1, 2, ..., M; where M is a number of all pixel values included in the compressed image data) of the compressed image data stored in compressed image storing means; and an approximate-histogram creating step of creating approximate histogram data approximately expressing the appearance frequency of the pixel value of the original image data by distributing the degree $L_i$ of the pixel value of the discrete histogram data corresponding to the pixel value $C_i$ (i=1, 2, ..., M) of the compressed image data to a degree L(x) of a pixel value x approximate to the pixel value $C_i$ so as to obtain a normal distribution having a standard deviation a with the pixel value $C_i$ as center.

With a first structure of an image search method according to the present invention of a system comprising:

an image database that stores a plurality of pieces of image data (hereinafter, referred to as "compressed image data") of a compressed image obtained by quantizing and run-length encoding pixel values of pixels of original image data; and reference-histogram storing means that stores pixel value histogram data (hereinafter, referred to as "reference histogram data") of a reference image. The image search method searches for the compressed image data stored in the image database that is similar to the reference image from among the compressed image data, and comprises:

a discrete-histogram creating step of creating discrete histogram data by calculating a total $L_i$ (hereinafter, referred to as a "degree of pixel value") of run lengths corresponding to a pixel value $C_i$ (i=1, 2, ..., M; where M is a total number of pixel values included in the compressed image data) of the compressed image data stored in the image database, at the entire region or a specific partial region of the compressed image data from among the pixel values;

an approximate-histogram creating step of creating approximate histogram data approximately expressing the appearance frequency of the pixel value of the original image data by distributing the degree $L_i$ of pixel value of the discrete histogram data corresponding to the pixel value $C_i$ (i=1, 2, ..., M) of the compressed image data to a degree L(x) of pixel value of a pixel value x approximate to the pixel value $C_i$ so as to have a normal distribution of a standard deviation σ with the pixel value $C_i$ as center;

a similarity calculating step of calculating the similarity between the approximate histogram data and the reference histogram data stored in the reference-histogram storing means; and an image selecting step of selecting one or a plurality of the image compressed data similar to the reference image on the basis of the similarity of the compressed image data.

With a second structure of the image search method according to the present invention, the image search method with the first structure comprises:

a first feature-point extracting step of setting one or a plurality of the compressed image data selected by the image selecting step as the compressed image data of a candidate image, extracting a feature point of the candidate image on the basis of the compressed image data of the candidate image, and calculating the coordinates of the feature point on the one-dimensional space;

a second feature-point extracting step of extracting a feature point of the reference image and calculating the coordinates of the feature point on the one-dimensional space;

a pairing step of searching for the feature point of the candidate image that is the most approximate to the feature point of the reference image on the one-dimensional space, and creating a set (hereinafter, referred to as a "set of pairs") of pairs of the feature point of the reference image and of the feature point of the candidate image;

a pair extracting step of creating a partial pair set obtained by extracting a part of the pairs in small order of the distance (hereinafter, referred to as a "pair-distance") between both the feature points of the pair from among the pair set;

a rating-scale calculating step of calculating a rating scale between the reference image and the candidate image on the basis of the pair-distance of the pair belonging to the partial pair set; and a determining step of determining the similarity between the reference image and the candidate image on the basis of the rating scale.

With a first structure of a program according to the present invention, the program is read to a computer and is executed, thereby functioning the computer as the matching apparatus according to any one of the first to sixth structures.

With a second structure of a program according to the present invention, the program is read to a computer and is executed, thereby functioning the computer as the histogram approximate restoring unit according to any one of the first to fifth structures.

With a third structure of a program according to the present invention, the program is read to a computer and is executed, thereby functioning the computer as the image search system according to any one of the first to third structures.

Advantages

As mentioned above, according to the present invention, a plurality of feature points projected on the multi-dimensional space are mapped on the one-dimensional space. The similarity between two objects on the one-dimensional space is determined on the basis of the distance between the feature points of the two objects. As a consequence, advantageously, the calculation processing of object matching is easy and the object matching is fast.

Further, according to the present invention, pixels are distributed so that pixels approximate to a discrete pixel value histogram of image data encoded compressed with run length have a normal distribution, and a continuous pixel value histogram of the original image is approximately restored from the discrete pixel value histogram. Therefore, it is possible to provide a method for efficiently the pixel value histogram of the original image with high precision. Further, since the similarity is obtained by comparing the approximately-restored pixel value histogram with the pixel value histogram of the reference image, the image data can be searched fast. With the above advantages, the present invention contributes to the fast processing with high precision of image search.

BRIEF DESCRIPTION OF THE DRAWINGS

FIG. 9(a) shows the original image of the query image and FIG. 9(b) shows the original image of the data image.

FIG. 10(a) shows the binary edge image of the original image of the query image and FIG. 10(b) shows the binary edge image of the original image of the data image.

FIG. 11(a) is a diagram showing Gaussian noise ($\sigma=10$, $\sigma$ is a distribution), FIG. 11(b) is a diagram showing Poisson noise, FIG. 11(c) is a diagram showing Multiplicative noise ($\upsilon=10$, $\upsilon$ is a distribution), FIG. 11(d) is a diagram showing Salt & Pepper Noise ($d=10$, d is noise density), FIG. 11(e) is a diagram showing random addition of edge points of 20% of the amount of the original image, and FIG. 11(f) is a diagram showing random deletion of edge points of 50% of the amount of the original image.

FIG. 22 is a flowchart showing the flow of matching processing using a matching device 38.

REFERENCE NUMERALS

Figure 1:
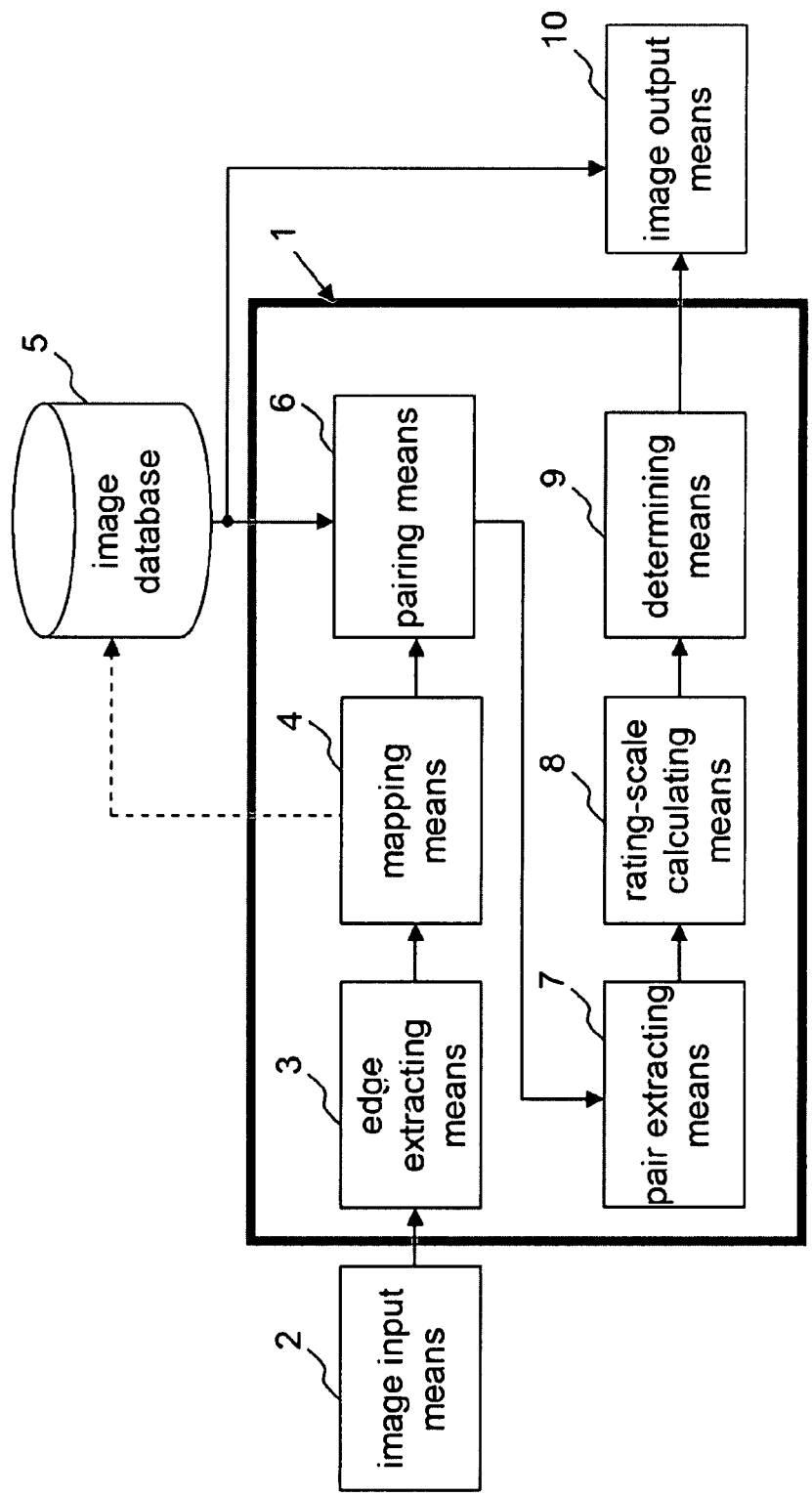
FIG. 1 is a block diagram showing the functional structure of an image search apparatus using a matching apparatus 1 according to the first embodiment of the present invention.

1: matching apparatus
2: image input means
2a: CCD
2b: ADC
3: edge extracting means
4: mapping means
5: image database
6: pairing means
7: pair extracting means
8: rating-scale calculating means
9: determining means
10: image output means
11: query image
12: Hilbert curve
20: image cut-out means
30: image search apparatus
31: frame memory
32: region extracting means
33: region image storing means
34: coarse search device
35: image encoding device
36: reference-image storing means
37: candidate-image storing means
38: matching device
41: histogram approximate restoring unit
45: histogram creating means
46: reference-histogram storing means
47: region extracting means
48: comparing and calculating means
49: image selecting means
51: region compressed image storing means
52: discrete-histogram creating means
53: approximate-histogram creating means
61: edge extracting means
62: matching unit
63: edge extracting means
65: pairing means
67: pair extracting means
68: rating-scale calculating means
69: determining means
71 to 74: histogram
75: approximate histogram

BEST MODE FOR CARRYING OUT THE INVENTION

Hereinbelow, embodiments of the present invention will be described with reference to the drawings.

First Embodiment

According to the first embodiment, an example of applying a matching apparatus according to the present invention to image matching will be described.

FIG. 1 is a block diagram showing the functional structure of an image search apparatus using a matching apparatus 1 according to the first embodiment of the present invention.

The image search apparatus according to the first embodiment comprises: the matching apparatus 1; image input means 2; an image database (hereinafter, referred to as an "image DB") 5; and image output means 10.

The image input means 2 is an interface for inputting a query image serving as a reference object or a data image serving as a compared object. The query image is directly input from image pickup means such as a digital camera and has an input form for selecting the input from a recording medium and the input from another information device via a communication line. Further, the image input means 2 is used for inputting the data image stored in the image DB 5.

The image DB 5 stores the data image serving as the compared object together with positional information of a feature point, obtained by mapping the data image serving as the compared object on the one-dimensional space by mapping means 4. If the image input from the image input means 2 is the data image, image information and the positional information of the feature point are written to the image DB 5.

The matching apparatus 1 compares the query image serving as the reference object with the data image serving as the compared object, and determines the similarity between both the images.

The image output means 10 reads the data image that is determined with the similarity to the query image by the matching apparatus 1 from the image DB 5, and outputs the read data image.

The matching apparatus 1 comprises: edge extracting means 3; the mapping means 4; pairing means 6; pair extracting means 7; rating-scale calculating means 8; and determining means 9.

The edge extracting means 3 analyzes the image input from the image input means 2 and extracts an edge as the feature point of the image. The edge means the border at which the luminance or color of the image discontinuously changes, and the contour or edge ridge of the object (a border line of discontinuous surfaces) is detected as the edge from the object image captured. According to the first embodiment, a pixel belonging to the edge is used as the feature point. Further, in order to reduce the number of feature points and easily perform the subsequent processing, only a particularly remarkable edge may be extracted and, alternatively, crosspoints of a plurality of edges may be used as the feature points.

The mapping means 4 maps the feature point extracted by the edge extracting means 3 to the one-dimensional space. The feature point extracted by the edge extracting means 3 is a pixel on a two-dimensional image, and the position of the feature point is displayed on the two-dimensional coordinate. The feature point is on the one-dimensional space by bijection, and the position of the feature point can be thus displayed on the one-dimensional coordinate. Hereinafter, this operation is called "mapping to the one-dimensional space". A specific method of the mapping to the one-dimensional space will be described later.

The pairing means 6 receives the positional information of the feature point of the query image from the mapping means 4 and further receives the positional information of the feature point from the image DB 5. The pairing means 6 searches for the feature point of the data image that is the nearest to the feature point of the query image, on the one-dimensional space, on the basis of the positional information of the feature points on both the images. Further, the pairing means 6 creates a pair set of the feature point of the query image and the feature point of the data image. Incidentally, a pair search method will be described later.

The pair extracting means 7 partly extracts the pair from the pair set of the feature point created by the pairing means 6 in small order of the pair distance so as to create a partial pair set.

The rating-scale calculating means 8 calculates, as a rating scale, an average value of the distance of the partial pair set created by the pair extracting means 7.

The determining means 9 compares the average values of the distance, serving as the rating scale, between the query image and the data image, and determines the data image having the minimum average value of the distance, as the data image that is the nearest the query image. Further, the average value of the distance is compared with a threshold, and the data image (single or plural) having the average value of the distance smaller than a predetermined threshold may be determined as the data that is approximate to the query image.

Incidentally, the image search apparatus according to the first embodiment can be realized by installing, to a computer, programs that describe processing sequences of the image input means 2, the edge extracting means 3, the mapping means 4, the pairing means 6, the pair extracting means 7, the rating-scale calculating means 8, the determining means 9, and the image output means 10 and by further arranging the image DB 5 to a storage device in the computer. As the computer, a proper type of existing personal computers may be selected. Alternatively, a dedicated hardware may be designed and may be integrated to a board or a chip.

Figure 2:
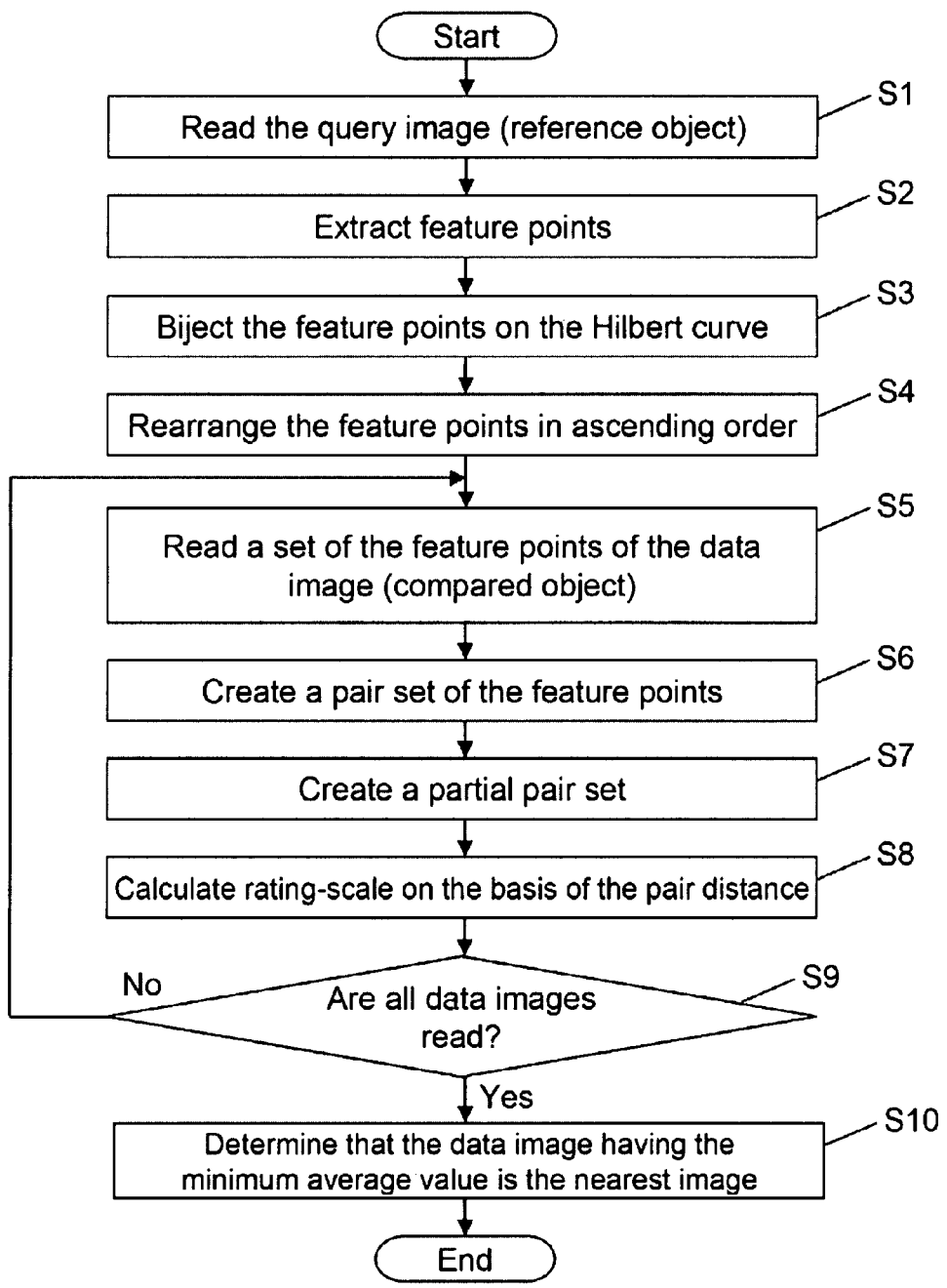
FIG. 2 is a flowchart showing an image search method using a matching method according to the first embodiment of the present invention.

FIG. 2 is a flowchart showing an image search method with the image search apparatus according to the first embodiment. Hereinbelow, the image search method will be described with reference to step numbers in FIG. 2.

First, in step S1, the image input means 2 reads the query image.

Subsequently, in step S2, the edge extracting means 3 analyzes the query image input from the image input means 2, and creates an edge image $\{Cq_i | i=1, 2, \ldots, N\}$ of the query image. Herein, data element (pixel) $Cq_i$ is a point on the two-dimensional plane ($Cq_i \in R^2$)

Subsequently, in step S3, the mapping means 4 bijects the edge image $\{Cq_i | i=1, 2, \ldots, N\}$ on the Hilbert curve passing through all pixels of the query image, thereby obtaining a set of feature points $\{Cqh_i | i=1, 2, \ldots, N\}$ on the Hilbert curve. Herein, the feature point $Cqh_i$ is a point on the one-dimensional plane ($Cqh_i \in R$).

Subsequently, in step S4, the pairing means 6 rearranges the feature point $Cqh_i$ ($i=1, 2, \ldots, N$) on the Hilbert curve, and obtains a set $\{u_j | j=1, 2, \ldots, N; u_j \leq u_2 \leq \ldots \leq u_N\}$ of coordinates of the feature point on the Hilbert curve.

Figure 3:
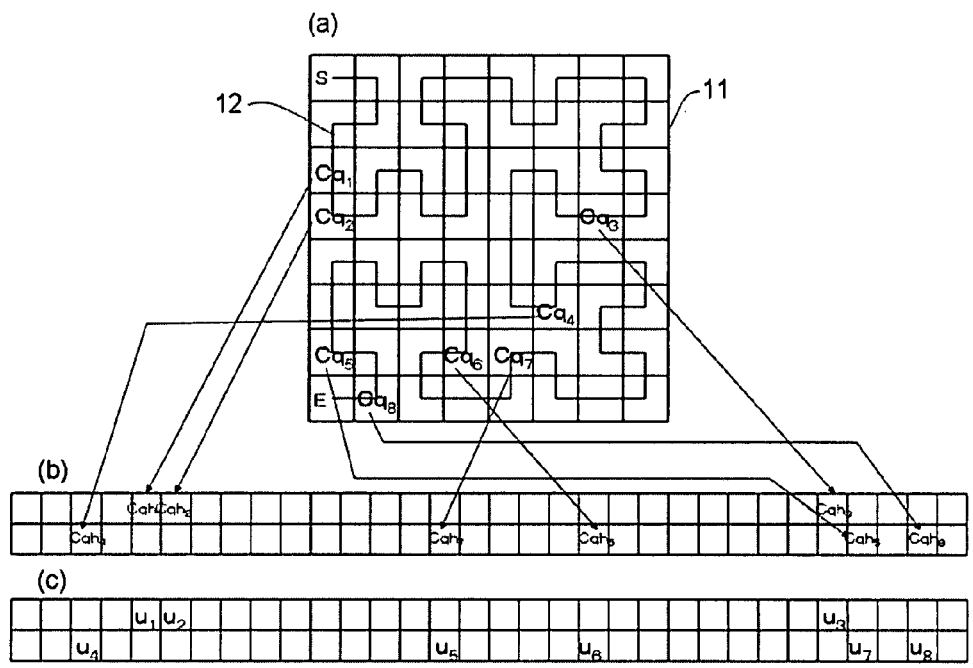
FIG. 3 is an illustrative diagram of mapping feature points on a query image to Hilbert curve.

FIG. 3 is illustrative diagrams showing the mapping of the feature point on the query image on the Hilbert curve. FIG. 3(*a*) shows the distribution of the feature point $Cq_i$ on the query image, FIG. 3(*b*) shows the distribution of the feature point $Cqh_i$ on the Hilbert curve, and FIG. 3(*c*) shows an alignment of a coordinate $u_j$ obtained by rearranging the feature point $Cqh_i$ in ascending order. Referring to FIG. 3(*a*), a query image 11 comprises 8×8 pixels. Hilbert curve 12 is a space filling curve passing through all pixels of the query image 11. A set $\{Cq_i | i=1, 2, \ldots, N\}$ of the feature points on the query image 11 is bijected on the Hilbert curve 12, thereby obtaining a set $\{Cqh_i | i=1, 2, N\}$ of the feature points on the Hilbert curve 12. The Hilbert curve 12 is extended and is displayed as a linear line. Then, the set $\{Cqh_i | i=1, 2, \ldots, N\}$ of the feature points on the Hilbert curve can be expressed as a point sequence on a linear line as shown in FIG. 3(*b*). The feature point $Cqh_i$ is rearranged in ascending order of the coordinates, thereby obtaining a column of a coordinate $u_j$ ($j=1, 2, \ldots, N; u_1 \leq u_2 \leq \ldots \leq u_N$) as shown in FIG. 3(*c*). As will be intuitively understood with reference to FIG. 3(*b*) or 3(*c*), the position of the point on the Hilbert curve is expressed on the one-dimensional coordinate (e.g., with a start point S on the Hilbert curve and the direction from the start point S to an end point E as the positive direction). Therefore, the distance between two points on the Hilbert curve can be calculated as the difference between one-dimensional coordinates.

Subsequently, in step S5, steps S2 to S4 are executed in advance with respect to the data image, and a set $\{v_k | k=1, 2, \ldots, N'; v_1 \leq v_2 \leq \ldots \leq v_{N'}\}$ of the calculated coordinates of the feature points of the data image is read from the image DB 5.

Subsequently, in step S6, the pairing means 6 obtains a data element $v_{I(j)}$ of the set $\{v_k|k=1, 2, \ldots, N'; v_j \leq v_j \leq \ldots \leq v_{N'}\}$ of coordinates of the feature points of the data image, for satisfying the following expression (1), from among a data element $u_j$ belonging to a set $\{u_j|j=1, 2, \ldots, N; u_j \leq u_j \leq \ldots \leq u_N\}$ of coordinates of the feature points of the query image. Further, the pairing means 6 creates a pair set $\{(u_j, v_{I(j)})|j=1, 2, \ldots, N\}$ of $u_j$ and $v_{I(j)}$. Herein, a symbol $\|\cdot\|$ denotes the Euclidean norm distance on the one-dimensional space.

[Expression 2]

$$\|u_j - v_{I(j)}\| = \min\{\|u_j - v_1\|, \|u_j - v_2\|, \ldots, \|u_j - v_N\|\} \quad (1)$$

Subsequently, in step S7, the pair extracting means 7 extracts P (where P is a natural number for satisfying a relation of P<N) data elements in small order of a pair distance $\|u_j - v_{I(j)}\|$ from among the pair set $\{(u_j, v_{I(j)})|j=1, 2, \ldots, N\}$, and creates a partial pair set $\{(u_m, v_{I(m)})|m=1, 2, \ldots, P\}$ of the feature points.

Subsequently, in step S8, the rating-scale calculating means 8 calculates an average value of the pair distance belonging to the partial pair set $\{(u_m, v_{I(m)})|m=1, 2, \ldots, P\}$ of the feature points with the following expression (2).

[Expression 3]

$$D_m = \frac{\sum_{m=1}^{P} \|u_m = v_{I(m)}\|}{P} \quad (2)$$

Subsequently, in step S9, when all data images are read and the average value is calculated, the processing advances to step S10. If not so in step S9, the processing returns to step S5.

Finally, in step S10, the determining means 9 calculates the average values of the pair distances of all data images, and determines that the data image having the minimum average value of the pair distance is a data image that is the nearest the query image. Further, the image output means 10 outputs the determined data image.

Incidentally, in step S6, in place of expression (1), the following expression (3) may be used. With the expression (3), the data element $v_{I(j)}$ is searched only within a range of the coordinate value larger than $u_j$, thereby reducing the calculation time.

[Expression 4]

$$v_{I(j)} \leq u_j \|u_j - v_{2(j)}\| = \min\{\|u_j - v_1\|, \|u_j - v_2\|, \ldots, \|u_j - v_N\|\}$$

Figure 4:
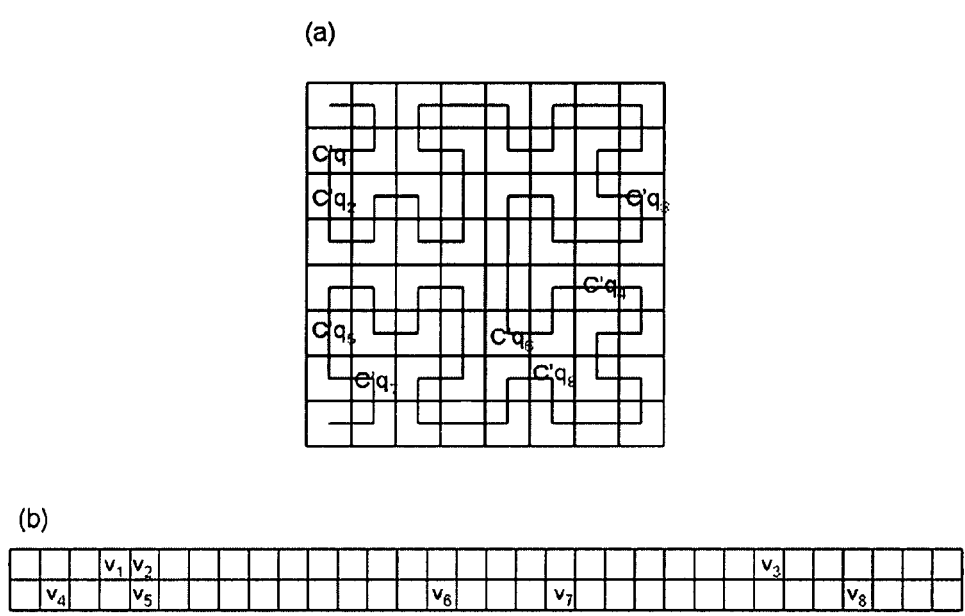
FIG. 4 is an illustrative diagram of mapping feature points on a data image to Hilbert curve.

Herein, a description will be given of the sequence for determining the similarity between both the query image shown in FIG. 3 and the data image shown in FIG. 4 as one example.

The feature points of the data image $C'q_i$ ($i=1, 2, \ldots, N'$) are distributed as shown in FIG. 4(a). The distributed feature points are mapped on the Hilbert curve, and are rearranged in ascending order. Then, a sequence of a feature point $v_k$ (k=1, 2, \ldots, N'; $v_1 \leq v_2 \leq \ldots \leq v_{N'}$) as shown in FIG. 4(b) is obtained.

Figure 5:
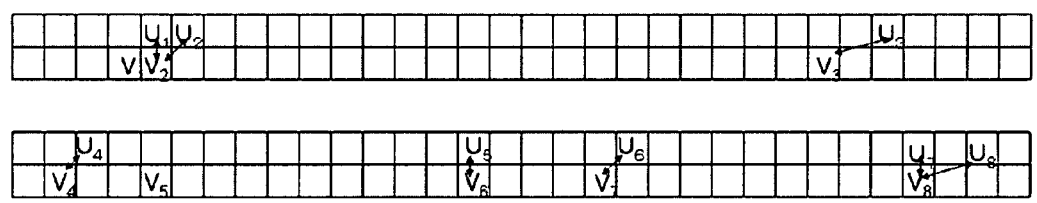
FIG. 5 is a diagram showing a pair of feature points on the query image and feature points on the data image.

With the feature point $v_k$ (k=1, 2, \ldots, N'; $v_1 \leq v_2 \leq \ldots \leq v_{N'}$) and the feature point of the query image $u_j$ (j=1, 2, N; $u_j \leq u_j \leq \ldots \leq u_N$) shown in FIG. 3(c), the expression (1) is used and pairs obtained by connecting arrows are thus obtained as shown in FIG. 5. That is, $(u_1, v_2), (u_2, v_2), (u_3, v_3), (u_4, v_4), (u_5, v_6), (u_6, v_7), (u_7, v_8)$, and $(u_8, v_8)$ are obtained, and the pair distances therebetween are 0, 1, 2, 1, 0, 1, 0, and 2. If 50% of the total pairs is extracted, the average value of four pairs having the minimum distance is calculated as 0.25.

Figure 6:
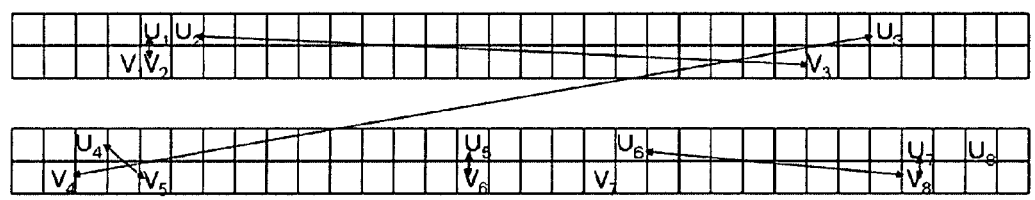
FIG. 6 is a diagram showing a pair of feature points on the query image and feature points on the data image.

Further, with respect to the feature point $v_k$ (k=1, 2, \ldots, N'; $v_1 \leq v_2 \leq \ldots \leq v_{N'}$) and the feature point $u_j$ (j=1, 2, N; $u_j \leq u_j \leq \ldots \leq u_N$), the expression (3) is used. Then, pairs obtained by connecting arrows are obtained as shown in FIG. 6. That is, $(u_1, v_2), (u_2, v_3), (u_3, v_4), (u_4, v_5), (u_5, v_6), (u_6, v_8)$, and $(u_7, v_8)$ are obtained, and the pair distances therebetween are 0, 12, 6, 2, 0, 9, and 0. The average value of four pairs having the minimum distance is 0.50.

Herein, it is to be determined to extract the pair at which ratio from among the pair set of the feature points and to create the partial set. Then, the following experiment is executed. That is, the query image having 16×16 pixels and the distribution of 20 feature points is provided. Further, the data image having 16×16 pixels, the distribution of 20 feature points, and Hausdorff distances between the query image and 20 feature points serving as $\sqrt{2}$, $\sqrt{5}$, $\sqrt{8}$, $\sqrt{10}$, and $\sqrt{26}$ is provided. Then, the pair set of the feature point is created between the query image and the data images, and the average value of the extracted pair distance is calculated while changing the number of pairs extracted from the pair set.

Table 1 shows a result of, upon creating the pair set under the expression (1) of the feature points between the query image and the data images. extracting a 5-th set (top5), 6-th set (top6), \ldots, and 15-th set (top15) from among the pairs having the minimum distance in ascending order and calculating the average values.

TABLE 1

| Distance | Top5 | Top6 | Top7 | Top8 | Top9 | Top10 | Top11 | Top12 | Top13 | Top14 | Top15 |
|---|---|---|---|---|---|---|---|---|---|---|---|
| $\sqrt{2}$ (1.41) | 1.00 | 1.00 | 1.14 | 1.25 | 1.33 | 1.40 | 1.45 | 1.50 | 1.54 | 1.57 | 1.60 |
| $\sqrt{5}$ (2.24) | 1.20 | 1.33 | 1.57 | 1.75 | 1.89 | 2.00 | 2.09 | 2.25 | 2.46 | 2.71 | 2.93 |
| $\sqrt{8}$ (2.83) | 1.00 | 1.00 | 1.14 | 1.25 | 1.33 | 1.50 | 1.64 | 1.83 | 2.15 | 2.50 | 2.80 |
| $\sqrt{10}$ (3.16) | 1.40 | 1.50 | 1.57 | 1.63 | 1.78 | 1.90 | 2.09 | 2.33 | 2.77 | 3.14 | 3.60 |
| $\sqrt{26}$ (5.10) | 1.40 | 1.67 | 2.00 | 2.50 | 2.89 | 3.30 | 3.73 | 4.25 | 4.92 | 5.64 | 6.67 |

Table 2 collects result of, upon creating a pair set under the condition of the expression (3) of the feature points between the query image and the data images, extracting pairs of a 3-rd set (top3), 4-th set (top4), \ldots, 10-th (top10) having the minimum distance in ascending order and calculating the average values thereof.

TABLE 2

| Distance | Top3 | Top4 | Top5 | Top6 | Top7 | Top8 | Top9 | Top10 |
|---|---|---|---|---|---|---|---|---|
| $\sqrt{2}$ (1.41) | 1.00 | 1.25 | 1.40 | 1.50 | 1.57 | 1.63 | 1.67 | 1.80 |
| $\sqrt{5}$ (2.24) | 1.67 | 2.00 | 2.20 | 2.33 | 2.57 | 2.75 | 3.00 | 3.20 |
| $\sqrt{8}$ (2.83) | 1.00 | 1.00 | 1.20 | 1.50 | 1.71 | 2.00 | 2.33 | 2.60 |
| $\sqrt{10}$ (3.16) | 1.67 | 2.00 | 2.20 | 2.50 | 2.71 | 3.00 | 3.22 | 3.50 |
| $\sqrt{26}$ (5.10) | 2.33 | 3.25 | 3.80 | 4.33 | 4.86 | 5.50 | 6.44 | 7.20 |

As will be understood with reference to Tables 1 and 2, 10 sets of pairs are extracted from the pairs having the minimum distance and the average values thereof are calculated, and values with high correlation with the Hausdorff distance are consequently obtained. Therefore, 50% of the total number of pairs is extracted in small order of the pair distance and a partial set is thus created. Further, the average value of the pair distances of the partial set is calculated, and it is expected that the correlation between the average value and the similarity between the images is increased.

Incidentally, according to the first embodiment, the matching of the two-dimensional images is described as an example and, however, the marching target is not limited to this according to the present invention. It is possible to use, as a matching target, an object that can describe features with coordinates of a plurality of feature points projected on the N-dimensional (where N is a natural number not less than 2) space, e.g., sound, character, and document.

Second Embodiment

According to the second embodiment, only the calculation of the rating scale is different from the first embodiment, and another structure and operation of the matching apparatus 1 are substantially similar to that according to the first embodiment.

The second embodiment uses, as the rating scale, Hirbert scanning distance (HSD) $d_{HSD}$, which will be defined later.

[Definition 1] (Hirbert Scanning Distance)

A reference image A and a compared image B are bijected on the one-dimensional space with Hirbert scanning, and data elements (pixels) thereof are thus designated by $u_j$ (j=1, 2, ..., N) and $v_k$ (k=1, 2, ..., N'). At this time, $d_{HSD}$ expressed by the following expression (4) is referred to as Hirbert scanning distance.

[Expression 5]

$$d_{HSD} = \frac{1}{N} \sum_{i=1}^{N} \rho\left(\min_{k} \|u_j - v_k\|\right) \quad (4)$$

Herein, a function $\rho$ is defined by the following expression (5). Reference numeral $\tau$ denotes a threshold (constant).

[Expression 6]

$$\rho(x) = \begin{cases} x & (x \leq \tau) \\ \tau & (x > \tau) \end{cases} \quad (5)$$

(End of Definition)

Figure 7:
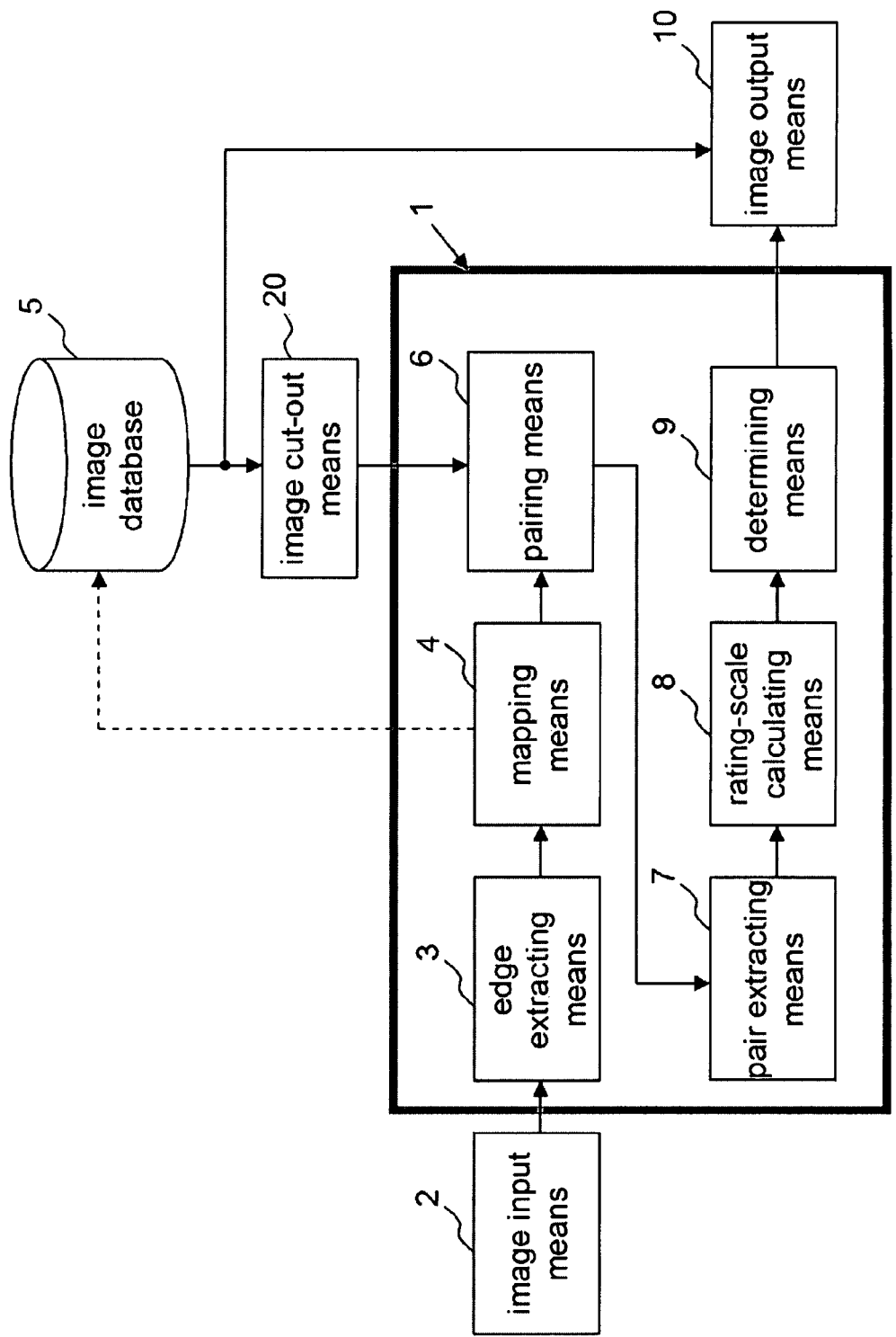
FIG. 7 is a block diagram showing the functional structure of an image search apparatus using a matching apparatus according to the second embodiment of the present invention.

FIG. 7 is a block diagram showing the functional structure of an image search apparatus using a matching apparatus according to the second embodiment. Referring to FIG. 7, the same components as those shown in FIG. 1 are designated by the same reference numerals, and a description thereof is omitted. The image search apparatus according to the second embodiment is different from that shown in FIG. 1 in that the image search apparatus has image cut-out means 20. The image cut-out means 20 cuts-out a partial image serving as the compared object from the data image stored in the image DB 5, and outputs the cut-out image to the pairing means 6.

Before matching processing of the image, first of all, information on the data image is stored to the image DB 5. In this case, the data image is input from the image input means 2, the processing in steps S1 to S4 described above according to the first embodiment is executed, and a set $\{v_k|k=1, 2, ..., M; v_1 \leq v_2 \leq ... \leq v_M\}$ of coordinates of the feature point of the data image is stored to the image DB 5.

Figure 8:
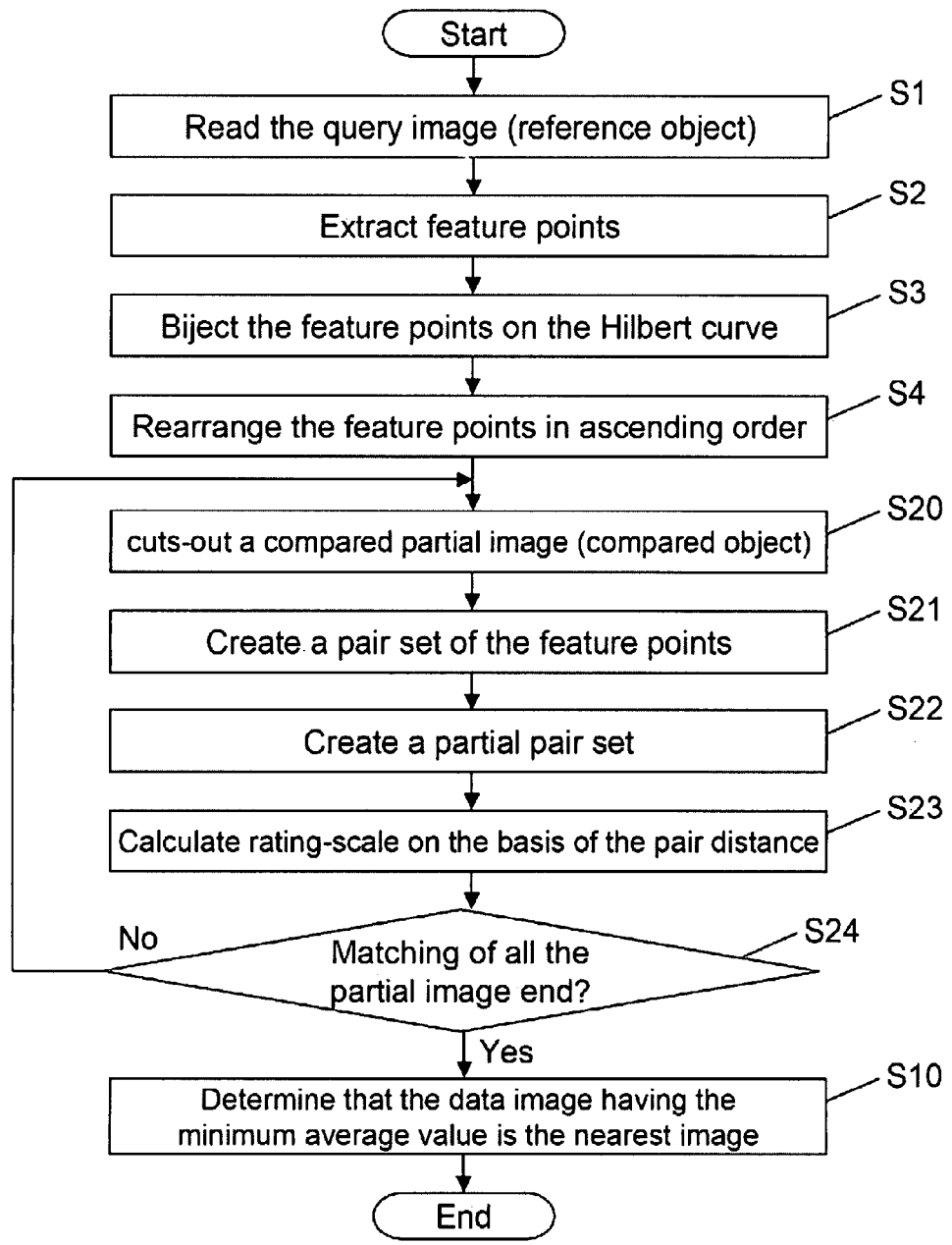
FIG. 8 is a flowchart showing matching processing of images with a matching apparatus 1 according to the second embodiment.
Figure 9:
FIG. 9 is diagrams showing original images of a query image and a data image, used for estimating a matching method according to the second embodiment.
Figure 9:

FIG. 8 is a flowchart showing the matching processing of the image with the matching apparatus 1 according to the second embodiment. Referring to FIG. 8, steps S1 to S4 are similar to those shown in FIG. 9 and therefore are not described.

In step S20, the image cut-out means 20 cuts-out a partial set $\{v_k|k=1, 2, ..., N'; v_1 \leq v_2 \leq ... \leq v_{N'}\}$ (N'≦M) of the coordinates of the feature points corresponding to a partial image (hereinafter, referred to as a "compared partial image") with the same size as that of the query image from a set $\{v|_k|k=1, 2, ..., M; v_1 \leq v_2 \leq ... \leq v_M\}$ of the coordinates of the feature point of the data image stored in the image DB 5. The position of the compared partial image is sequentially moved from the upper-left corner of the image data and is thus set.

Subsequently, in step S21, the pairing means 6 obtains a data element $v_{l(j)}$ of a set $\{v_k|k=1, 2, ..., N'; v_j \leq v_j \leq ... \leq v_{N'}\}$ of the coordinates of the feature point of the data image for satisfying the expression (1) from among the data element $u_j$ belonging to a set $\{u_j|j=1, 2, ..., N; u_j \leq u_j \leq ... \leq u_N\}$ of the coordinates of the feature point of the query image. Further, a pair set $\{(u_j, v_{l(j)})|j=1, 2, ..., N\}$ of $u_j$ and $v_{l(j)}$ is created.

Subsequently, in step S22, the pair extracting means 7 extracts a pair having the pair distance $\|u_j-v_{l(j)}\|$ not more than a threshold $\tau$ from among the pair set $\{(u_j, v_{1(j)})|j=1, 2, ..., N\}$. The extracted pair set, is set as a partial pair set $\{(u_m, v_{l(m)})|m=1, 2, ..., P\}$. Herein, P denotes a number of the extracted data elements.

Subsequently, in step S23, the rating-scale calculating means 8 calculates a sum S1 of the pair distances belonging to a partial pair set $\{(u_m, v_{l(m)})|m=1, 2, ..., P\}$ by the following expression (6).

[Expression 7]

$$S1 = \sum_{m=1}^{P} \|u_m - v_{l(m)}\| \quad (6)$$

Further, the rating-scale calculating means 8 calculates a value $S2=\tau(N-P)$ obtained by multiplying a threshold $\tau$ to a number N−P pairs non-belonging to the partial pair set $\{(u_m, v_{l(m)})|m=1, 2, ..., P\}$, and divides a sum S1+S2 by the total N of pairs, thereby calculating Hirbert scanning distance $d_{HSD}$ as the rating scale.

Subsequently, in step S24, if the cut-out operating of the partial sets of the coordinates of the feature points corresponding to the compared partial images at all positions ends, the processing advances to step S10. If not so in step S24, the processing returns to step S20.

Finally, in step S10, the determining means 9 determines that the compared partial image having the minimum average value of the pair distance is the most approximate to the query image. Further, the image output means 10 outputs the positional coordinates of the compared partial image as mentioned above.

Subsequently, an example of specific matching with the matching apparatus according to the second embodiment will be described.

Example 1

In order to evaluate the robustness to noise and the precision of the matching apparatus according to the second embodiment, an image shown in FIG. 9(a) is used as an original image. A part of the original is cut-off and the query image shown in FIG. 9(b) is created. The size of the original image is 512×256 pixels, and the size of the query image is 128×128 pixels. The best matching position of the query image in the original image is (28, 119) (Incidentally, the origin of the coordinate system is expressed as the coordinate of the upper-left vertex, and the position of the query image is expressed as the coordinate of the upper-left vertex of the query image).

In order to evaluate the precision of the matching processing, the original image shown in FIG. 9(a) is set as a data image A, and the data image A is compared with the query image. Further, in order to evaluate the robustness to the noise of the matching processing, images B to G obtained by adding the noise to the data image shown in FIG. 9(a) are created, are set as the data images, and are compared with the query image.

The data image B is obtained by adding Gaussian noise ($\sigma=10$, $\sigma$ is distribution) to the original image shown in FIG. 9(a).

The data image C is obtained by adding Poisson noise to the original image shown in FIG. 9(a).

The data image D is obtained by adding Multiplicative noise ($\upsilon=10$, $\upsilon$ is distribution) to the original image shown in FIG. 9(a).

The data image E is obtained by adding Salt & Pepper Noise) (d=10, d is noise density) to the original image shown in FIG. 9(a).

The data image F is obtained by random adding edge points of 20% of the amount of the original image shown in FIG. 9(a).

The data image G is obtained by random deleting edge points of 50% of the amount of the original image shown in FIG. 9(a).

Figure 10:
FIG. 10 is diagrams showing binary edge images obtained by extracting edges of the images shown in FIG. 9.
Figure 10:
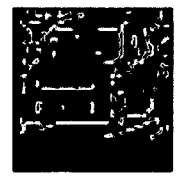
Figure 11:
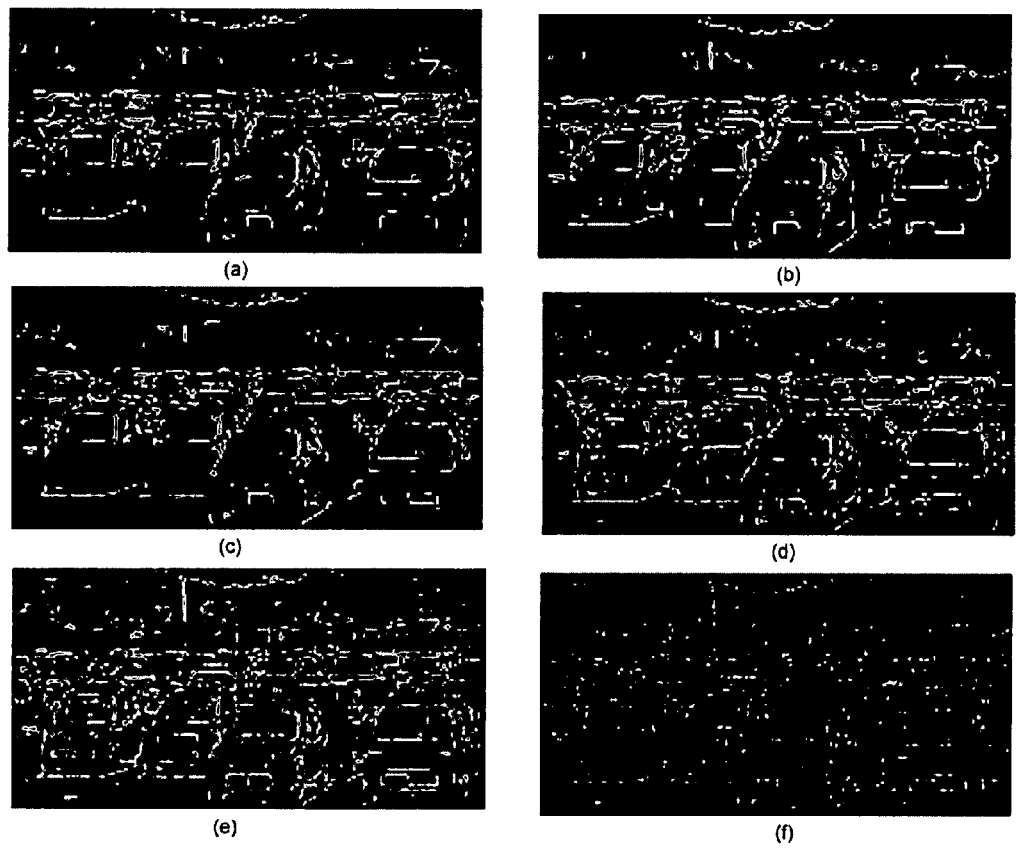
FIG. 11 is diagrams showing the data image obtained by adding various noises to the original images shown in FIG. 9.

FIGS. 10(a) and 10(b) show binary edge images obtained by extracting edges from the images shown in FIGS. 9(a) and 9(b). Further, FIGS. 11(a) to 11(f) show binary edge images obtained by extracting edges from the data images B to G.

The data images are compared with the query image with the image search apparatus according to the second embodiment, and the position of the compared partial image matching the query image within the data images is detected. Incidentally, it is assumed that $\tau=10$.

As comparisons, with a matching method for minimizing the Housdorff distance (HD), a matching method for minimizing the partial Housdorff distance (PHD), and a matching method for minimizing modified Housdorff distance (MHD), the positions of the compared partial images matching the query image within the data images are detected. (Table 3) and (Table 4) show the detected matching positions of the compared partial images with the methods and root-mean-square (RMS). The root-mean-square RMS is defined by the following expression (7).

[Expression 8]

$$\mathrm{RMS} = \sqrt{(\omega_x - \omega_{x0})^2 + (\omega_y - \omega_{y0})^2} \quad (7)$$

Herein, $(\omega_x, \omega_y)$ denotes the matching position detected with the method, and $(\omega_{x0}, \omega_{y0})$ denotes the accurately best matching position.

TABLE 3

| | Position result | | | | | | |
|---|---|---|---|---|---|---|---|
| Measure | image A | image B | image C | image D | image E | image F | image G |
| HD   | (27, 119) | (233, 117) | (219, 118) | (203, 114) | (23, 129)  | (24, 118) | (31, 121) |
| PHD1 | (27, 119) | (28, 115)  | (28, 119)  | (205, 110) | (27, 119)  | (28, 119) | (28, 119) |
| PHD2 | (28, 119) | (199, 113) | (26, 115)  | (212, 112) | (28, 117)  | (28, 119) | (27, 118) |
| PHD3 | (33, 117) | (27, 118)  | (28, 119)  | (27, 119)  | (28, 119)  | (27, 119) | (26, 119) |
| MHD  | (28, 119) | (208, 112) | (28, 119)  | (207, 114) | (28, 119)  | (28, 119) | (28, 119) |
| HSD  | (28, 119) | (28, 119)  | (28, 119)  | (28, 119)  | (28, 119)  | (28, 119) | (28, 119) |

TABLE 4

| | RMS | | | | | | |
|---|---|---|---|---|---|---|---|
| Measure | image A | image B | image C | image D | image E | image F | image G |
| HD   | 1.0 | 205.0 | 191.0 | 175.1 | 11.2 | 4.1 | 3.6 |
| PHD1 | 1.0 | 4.0   | 0.0   | 177.2 | 1.0  | 0.0 | 0.0 |
| PHD2 | 0.0 | 171.1 | 4.47  | 184.1 | 2.0  | 0.0 | 1.4 |
| PHD3 | 5.4 | 1.4   | 0.0   | 1.0   | 0.0  | 1.0 | 2.0 |
| MHD  | 0.0 | 180.1 | 0.0   | 179.1 | 0.0  | 0.0 | 0.0 |
| HSD  | 0.0 | 0.0   | 0.0   | 0.0   | 0.0  | 0.0 | 0.0 |

Referring to (Table 3) and (Table 4), HSD denotes a result of detecting the position with the matching method according to the second embodiment. From this result, obviously, the matching method according to the present invention has matching precision and robustness to the noise, higher than that with another method in another comparison.

Figure 12:
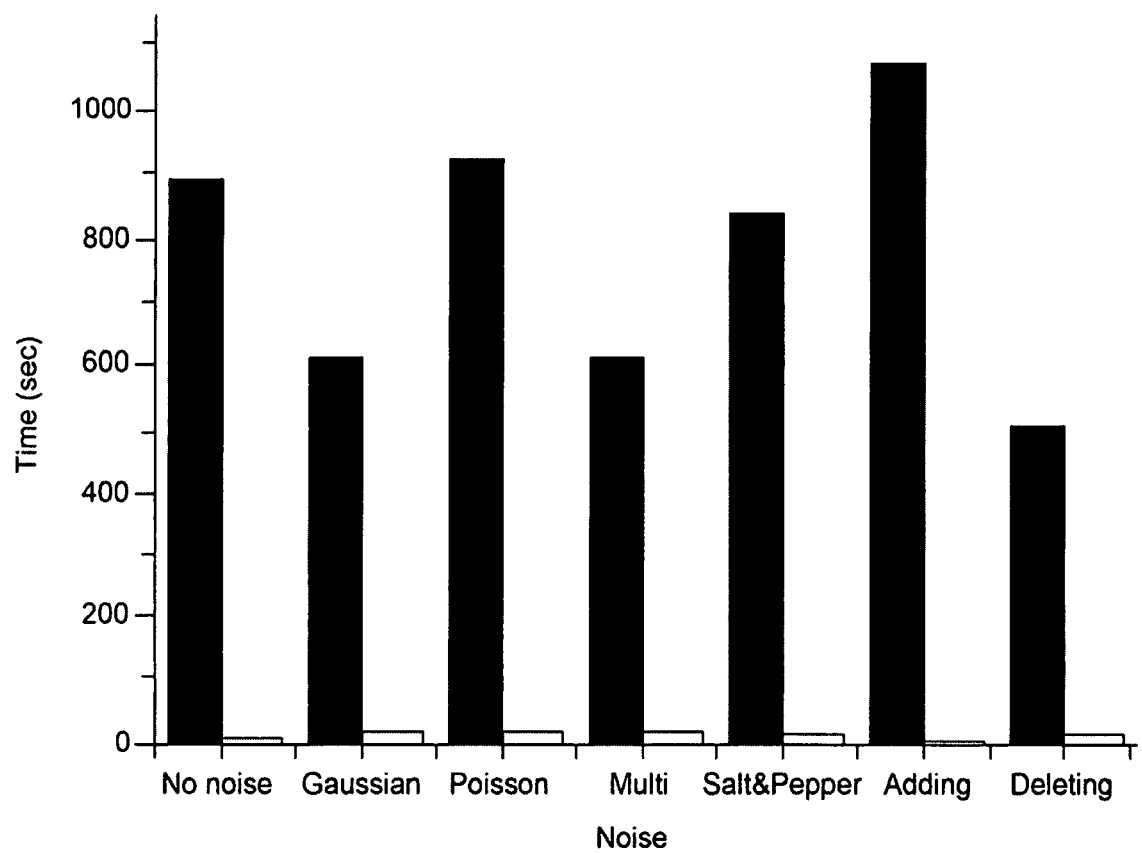
FIG. 12 is a diagram showing the comparison of calculation time between a matching method using the minimization of MHD and the matching method according to the second embodiment.

Further, FIG. 12 is a diagram showing the comparison of the calculation time between the matching method for minimizing the MHD and the matching method according to the second embodiment. With the method MHD, the calculation speed is the fastest in the measurement of the Hausdorff distance. As will be obviously from the result shown in FIG. 12, the calculation time with the matching method according to the second embodiment can be $\frac{1}{10}$ or less than that with the conventional matching method as the comparison.

(End of Example)

Third Embodiment

Figure 13:
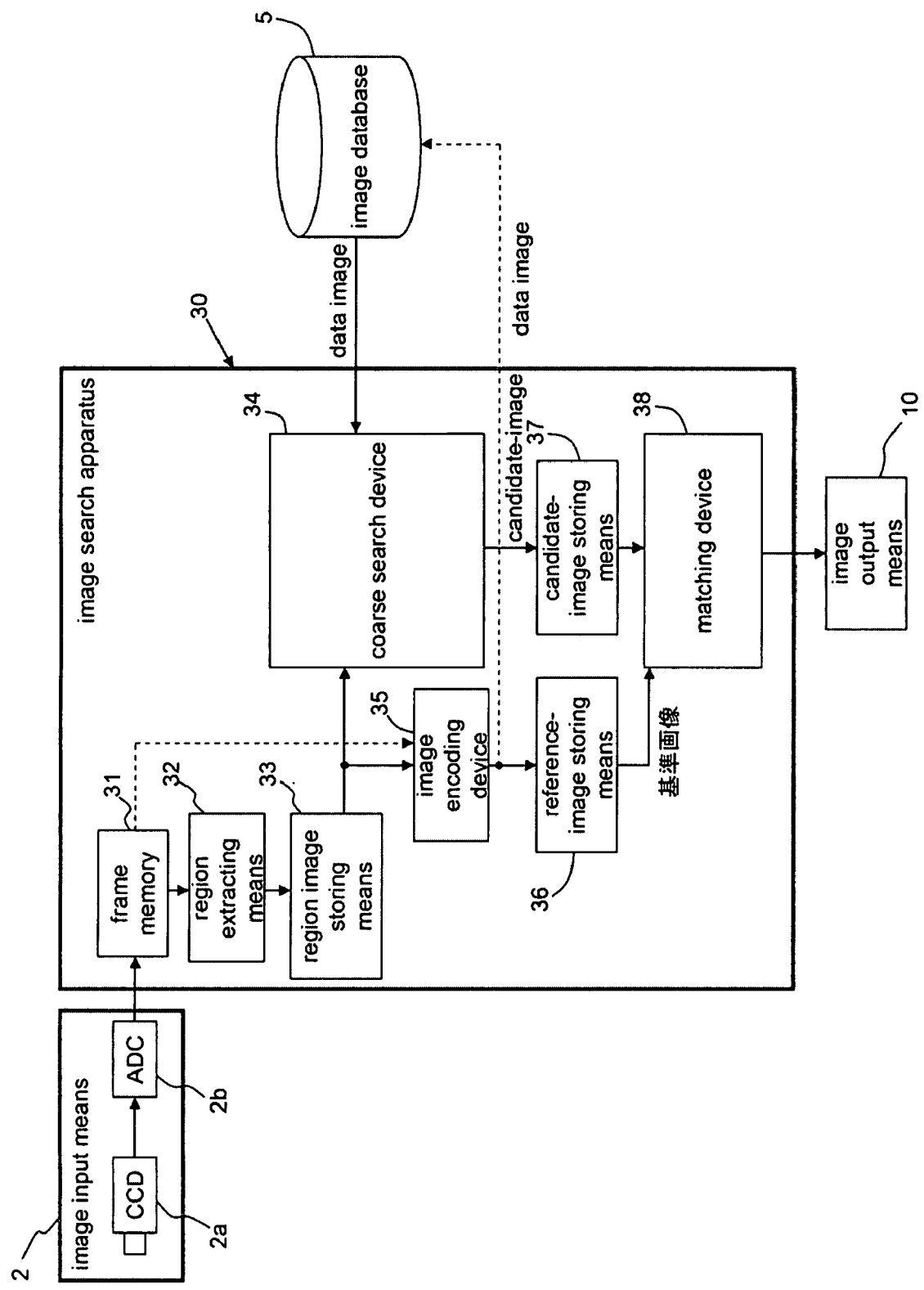
FIG. 13 is a block diagram showing the structure of an image search system according to the third embodiment of the present invention.

FIG. 13 is a block diagram showing the structure of an image search system according to the third embodiment of the present invention. The image search system according to the third embodiment comprises: the image input means 2, an image search apparatus 30, the image DB 5, and the image output means 10. Incidentally, the image search system according to the third embodiment is used for a system for determining the type of microparticles by comparing an image similar to an image of the microparticles with images of particles stored in the image DB 5.

The image input means 2 is an interface for inputting a reference image as the reference object or a data image as the compared object. The image input means 2 comprises: charge coupled devices (CCD) 2a; and an analog to digital converter (ADC) 2b. The image captured by the CCD 2a is quantized by the ADC 2b, and is output to the image search apparatus 30.

The image DB 5 is means that one-dimensionally sets the data image serving as the compared object with the Hirbert scanning, and stores a run-length encoded compressed data image.

The image search apparatus 30 searches for the data image approximate to the reference image input from the image input means 2 from among the compressed data images stored in the image DB 5, and outputs the searched data image to the image output means 10.

The image output means 10 is an interface for outputting the data image determined as that similar to the reference image by the image search apparatus 30. The image output means 10 comprises output devices such as a display, a printer, and an external storage device.

The image search apparatus 30 according to the third embodiment comprises: a frame memory 31; region extracting means 32; region image storing means 33; a coarse search device 34; an image encoding device 35; reference-image storing means 36; candidate-image storing means 37; and matching device 38.

The frame memory 31 stores the image captured by the CCD 2a and digitized by the ADC 2b. The region extracting means 32 extracts, as the reference image, a partial image (e.g., image of microparticle portion) from among the images stored in the frame memory 31, and stores the extracted image to the region image storing means 33.

The coarse search device 34 searches for the compressed data image approximate to the reference image input from the image input means 2 from among the image DB 5, extracts one or a plurality of compressed candidate images, and stores the extracted image to the candidate-image storing means 37.

The image encoding device 35 one-dimensionally sets the image (two-dimensional image) input from the image input means 2 with the Hirbert scanning, and further creates the compressed image with the run-length encoding. The compressed image is stored to the reference-image storing means 36.

The matching device 38 compares the compressed candidate image stored in the candidate-image storing means 37 with the compressed reference image stored in the reference-image storing means 36. Further, the matching device 38 selects the compressed candidate image that is the most similar to the compressed reference image, and outputs the selected image to the image output means 10.

Figure 14:
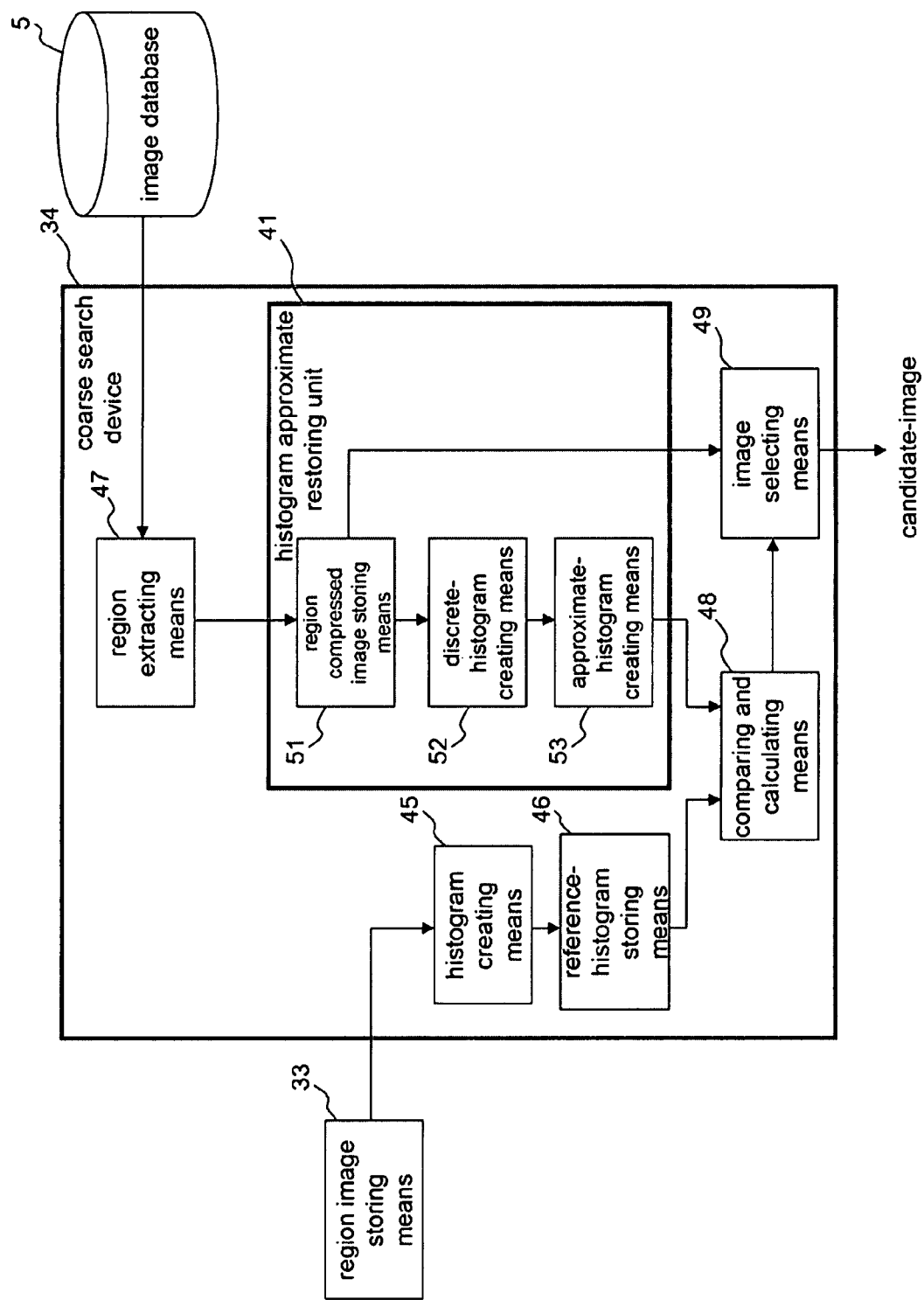
FIG. 14 is a block diagram showing the structure of a coarse search device 34 shown in FIG. 13.

FIG. 14 is a block diagram showing the structure of the coarse search device 34 shown in FIG. 13. The coarse search device 34 comprises: a histogram approximate restoring unit 41; histogram creating means 45; reference-histogram storing means 46; region extracting means 47; comparing and calculating means 48; and image selecting means 49.

The histogram creating means 45 creates a histogram (hereinafter, referred to as "reference histogram data") of a pixel value of a pixel included in the reference image stored in the region image storing means 33, and stores the created histogram to the reference-histogram storing means 46.

The image DB 5 stores a plurality of compressed data images. Herein, the compressed data image is obtained quantizing the pixel value of the pixel of the original image and run-length encoding the quantized value. Incidentally, the details of the run-length encoding will be described later.

The region extracting means 47 reads the compressed data image from the image DB 5, and outputs all the read images or cuts-out the output image and outputs the cut-out image. Because, when a partial region of the compressed data image includes the image of the microparticles, only the part of the microparticles is extracted.

The histogram approximate restoring unit 41 approximately restores a pixel value histogram of the original image or the partial image thereof from the compressed data image or partial image thereof (hereinafter, referred to as "region compressed data image") read from the image DB 5 by the region extracting means 47. The histogram approximate restoring unit 41 comprises: region compressed image storing means 51; discrete-histogram creating means 52; and approximate-histogram creating means 53.

The region compressed image storing means 51 temporarily stores the region compressed data image output from the region extracting means 47. The discrete-histogram creating means 52 creates discrete histogram data from the region compressed data image stored in the region compressed image storing means 51. The discrete histogram data will be described later. The approximate-histogram creating means 53 allows the discrete histogram data output from the region compressed image storing means 51 to have a distribution of the degree of pixel value, thereby creating the approximate histogram data.

The comparing and calculating means 48 calculates the similarity between the reference histogram data stored in the reference-histogram storing means 46 and the approximate histogram data output from the approximate-histogram creating means 53. The image selecting means 49 selects one or a plurality of the compressed data images similar to the reference image on the basis of the similarity between the compressed data images, and outputs the selected image as a candidate image.

Figure 15:
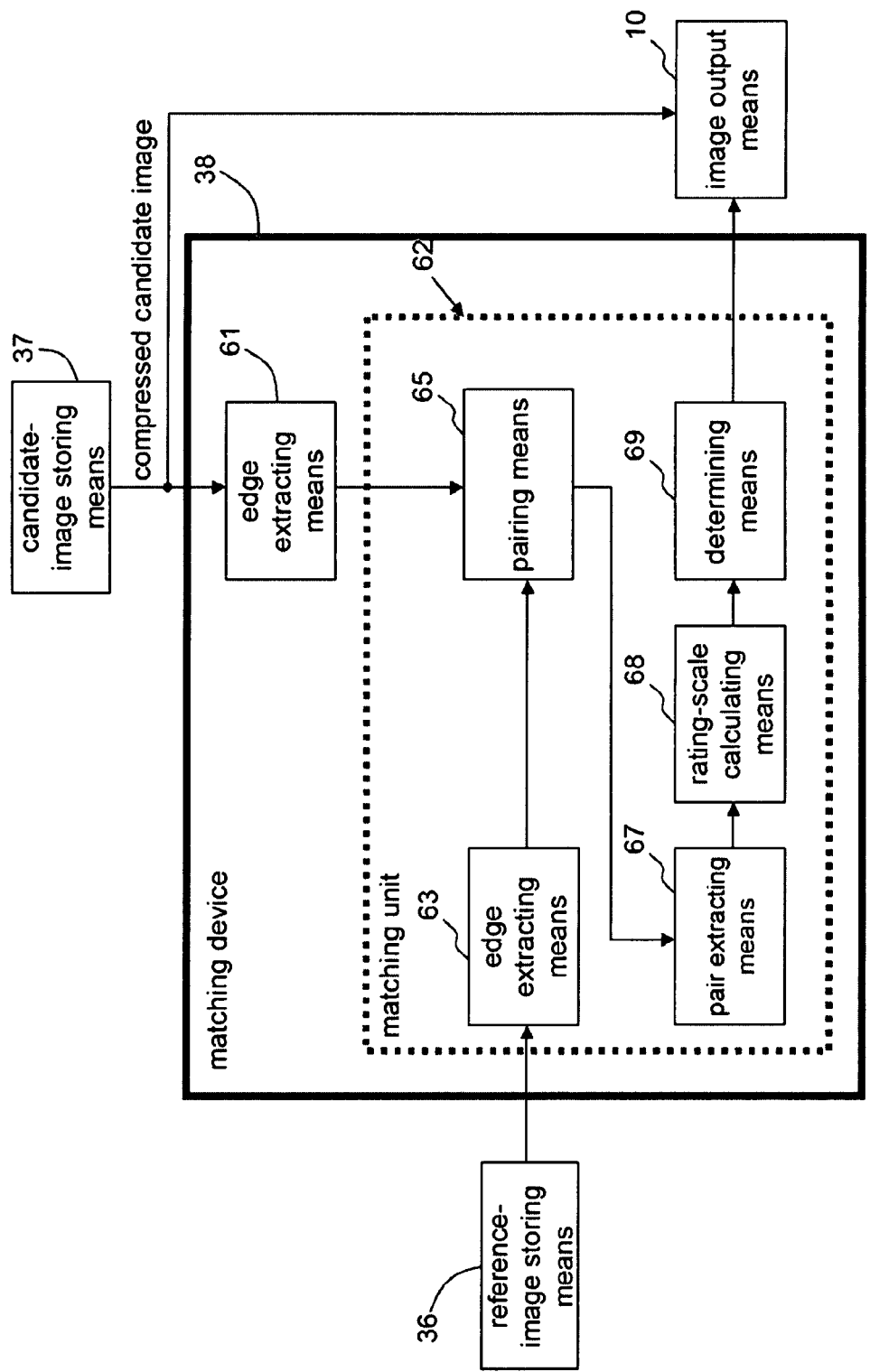
FIG. 15 is a block diagram showing the structure of a matching device 38 shown in FIG. 13.

FIG. 15 is a block diagram showing the structure of the matching device 38 shown in FIG. 13. The matching device 38 comprises edge extracting means 61 and a matching unit 62. The edge extracting means 61 decodes and one-dimensionally sets the compressed candidate images output from the coarse search device 34, extracts the edge, and creates a one-dimensional edge image (hereinafter, referred to as a "one-dimensional candidate edge image").

The matching unit 62 comprises: edge extracting means 63; pairing means 65; pair extracting means 67; rating-scale calculating means 68; and determining means 69.

The edge extracting means 63 decodes the compressed image of the reference image output from the image encoding device 35, and creates a one-dimensional reference image. The edge extracting means 63 analyzes the one-dimensional reference image, extracts an edge as the feature point, and creates a one-dimensional edge image (hereinafter, referred to as a "one-dimensional reference edge image").

The pairing means 65 searches for the feature point of the candidate image the most approximate to the edge point of the reference image on the one-dimensional space on the basis of the one-dimensional candidate edge image and the one-dimensional reference edge image. Further, the pairing means 65 creates a pair set of the edge point of the reference image and the edge point of the candidate image.

The pair extracting means 67 partly extracts the pairs and creates a partial pair set in small order of the pair distance from the pair set of the edge points created by the pairing means 65.

The rating-scale calculating means 68 calculates, as a rating scale, an average value of the distance of the partial pair set created by the pair extracting means 67.

The determining means 69 compares the average values at the rating scale between the reference image and the candidate image, and determines that the candidate image having the minimum average value of the distance is set as the candidate image the most approximate to the reference image.

The image output means 10 outputs the compressed candidate image that is determined as the image the most approximate to the reference image by the determining means 69.

Incidentally, the image search system according to the third embodiment may be hardware-structured as an LSI chip. Alternatively, the image search system may be structured by setting components as functional modules by loading a program to a general computer.

Next, a description will be given of the compressed image data stored in the image DB 5 shown in FIGS. 13 and 14. The compressed data image is obtained by one-dimensionally setting the original image with the Hirbert scanning, and the pixel value of the pixel is quantized and run-length encoded. In the run-length encoding, the run length is determined that the distribution of the pixel values of the original image corresponding to the run is a predetermined threshold Γ or less. The compression algorithm is disclosed in details in Patent Documents 6 and 7 and Non-Patent Document 1. Herein, only one example of the compression algorithm will be described.

First, the two-dimensional original image is scanned, thereby setting the one-dimensional original image. The one-dimensional original image is referred to as $\{x_i; i=1, 2, \ldots, N\}$. Herein, N denotes the number of pixels of the original image.

Subsequently, the one-dimensional original image is subjected to the following reflexive two-division processing.

Figure 16:
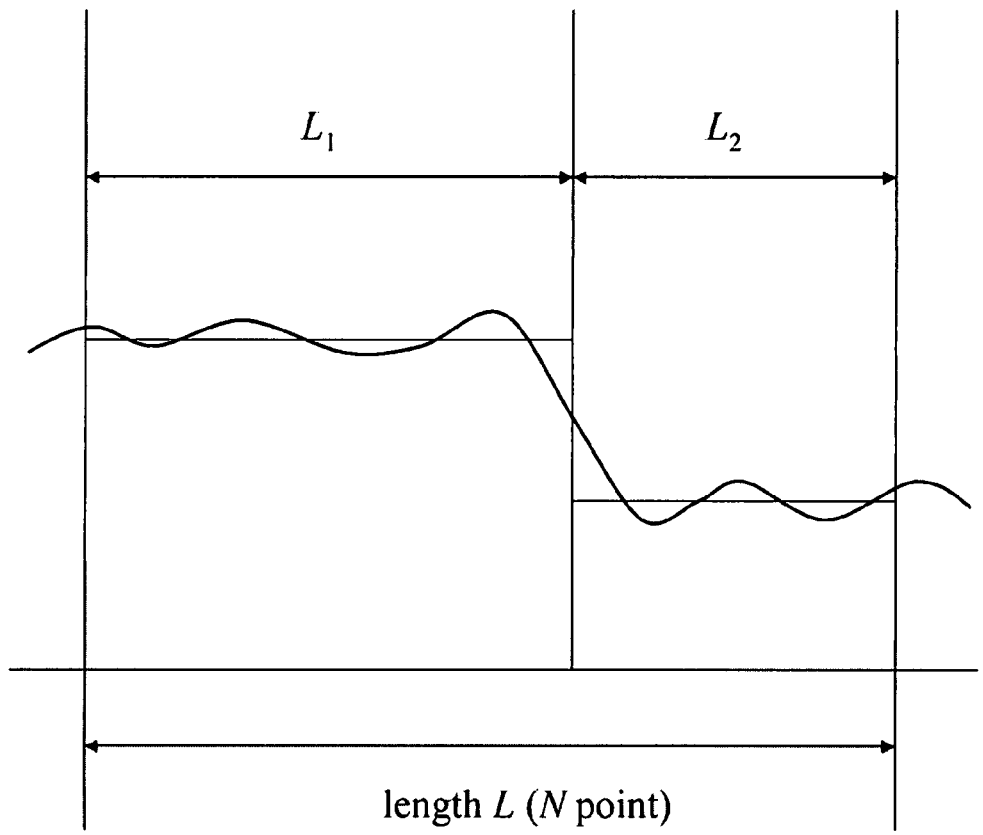
FIG. 16 is a diagram showing a division example of dividing a length L on a one-dimensional image into a length $L_1$ and a length $L_2$.

First, a one-dimensional pixel line at a length l is referred to as $\{x_i; i=1, 2, \ldots, N\}$. A length L is divided into a length $L_1$ and a length $L_2$. FIG. 16 shows division examples. The average values of the lengths L, $L_1$, and $L_2$ are expressed by the following expressions (8), (9), and (10). The number of pixels at the length $L_1$ is $N_1$.

[Expression 9]

$$\bar{x} = \frac{1}{N}\sum_{i=1}^{N} x_i \quad (8)$$

$$\bar{x}_1(N_1) = \frac{1}{N_1}\sum_{i=1}^{N_1} x_i \quad (9)$$

$$\bar{x}_2(N_1) = \frac{1}{N-N_1}\sum_{i=N_1+1}^{N} x_i \quad (10)$$

In the reflexive two division, the accumulation of squares of an error at the lengths L, $L_1$, and $L_2$ is referred to as e, $e_1$, and $e_2$, respectively. Then, e, $e_1$, and $e_2$ are expressed by the following expressions (11), (12), and (13).

[Expression 10]

$$e = \sum_{i=1}^{N}(x_i - \bar{x})^2 \quad (11)$$

$$e_1(N_1) = \sum_{i=1}^{N_1}(x_i - \bar{x}_1(N_1))^2 \quad (12)$$

$$e_2(N_1) = \sum_{i=N_1+1}^{N}(x_i - \bar{x}_2(N_1))^2 \quad (13)$$

A two-division point is $N_1$ ($1<N_1<N$) at which the following evaluation expression (14) is minimum.

[Expression 11]

$$Eval(N_1) = e_1(N_1) + e_2(N_1) \quad (14)$$
$$= \sum_{i=1}^{N} x_i^2 - N_1\bar{x}_1^2(N_1) - \frac{(N\bar{x} - N_1\bar{x}_1(N_1))^2}{N - N_1}$$

The two-division operation is reflexively repeated until Eval is the predetermined threshold Γ and N is $N_{max}$ or less.

With this algorithm, the one-dimensional original image is divided into a plurality of lengths. The divided length is set as a run, an average value of pixels at the length (run) is set as a pixel value at the run, and the run-length encoding is performed. With this run-length encoding, the pixel value at the run is quantized in the one-dimensional original image, and the distribution of pixel values of the original image corresponding to the run is the predetermined threshold Γ or less. A plurality of the above-obtained compressed data images is stored in the image DB 5.

Figure 17:
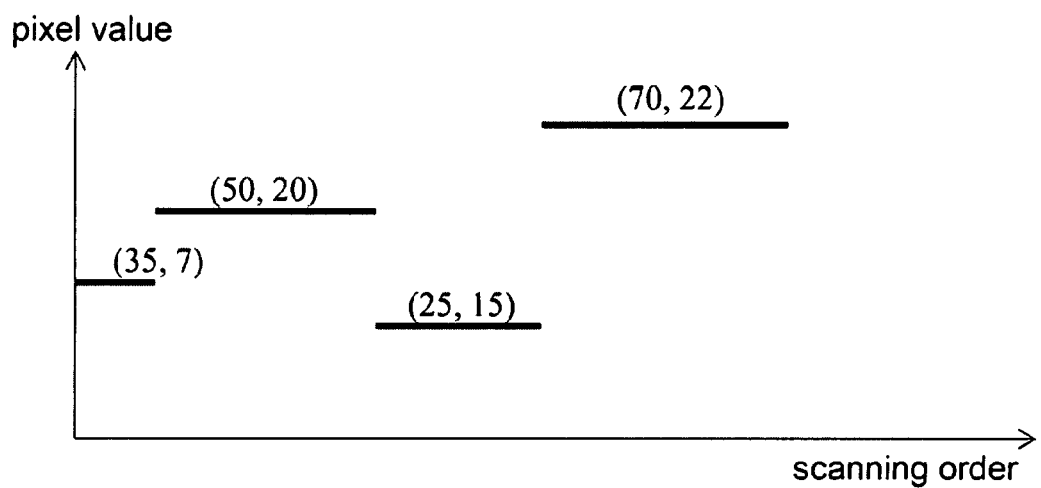
FIG. 17 is a schematic diagram showing an example of image data compressed by run-length encoding.

FIG. 17 is a schematic diagram showing an example of the image data compressed by the run-length encoding. Referring to FIG. 17, the abscissa denotes the scanning order and the ordinate denotes a pixel value (luminance). In a set of numbers in brackets in FIG. 17, the former number denotes a pixel value (herein, luminance), and the latter number denotes the run-length. In general, the compressed data image is expressed by the following expression (15) where $C_i$ denotes the pixel value, $l_i$ denotes the run-length, and $N_1$ denotes the number of runs.

[Expression 12]

$$\{(C_i, l_i)|i=1, 2, \ldots N_1\} \quad (15)$$

Next, a description will be given of the operation of the image search system with the above-mentioned structure third embodiment. In the image search system according to the third embodiment, first, the coarse search device 34 searches for one or a plurality of image data similar to the reference image cut-out from the captured image from the image DB 5, and extracts the searched data as the candidate image. Further, the matching device 38 compares the candidate image with the reference image, and extracts the candidate image that is the most similar to the reference image. Hereinbelow, a description will be given in accordance with the flow of the extraction of the candidate image by the coarse search device 34 and the extraction of the candidate image that is the most similar to the reference image by the matching device 38.

[1] Extract Candidate Image

First, as pre-processing, the reference histogram data is created from the captured image data. First, the CCD 2a captures an image of a subject such as microparticles. Image data output from the CCD 2a is digitized by the ADC 2b, and is stored in the frame memory 31 (refer to FIG. 13). The region extracting means 32 extracts a target region from the image stored in the frame memory 31, and stores the extracted region image, as the reference image, to the region image storing means 33. Incidentally, the region extracting method of the region extracting means 32 can be various well-known ones and, however, is not described because it does not directly relate to the present invention.

Subsequently, in the coarse search device 34, the histogram creating means 45 creates the histogram of the pixel value from the reference image stored in the region image storing means 33, and stores the created histogram as the reference histogram data to the reference-histogram storing means 46.

After ending the above-mentioned pre-processing, coarse search processing for searching for the compressed image data of the image similar to the reference image from among the compressed data image stored in the image DB 5 is executed as follows.

Figure 18:
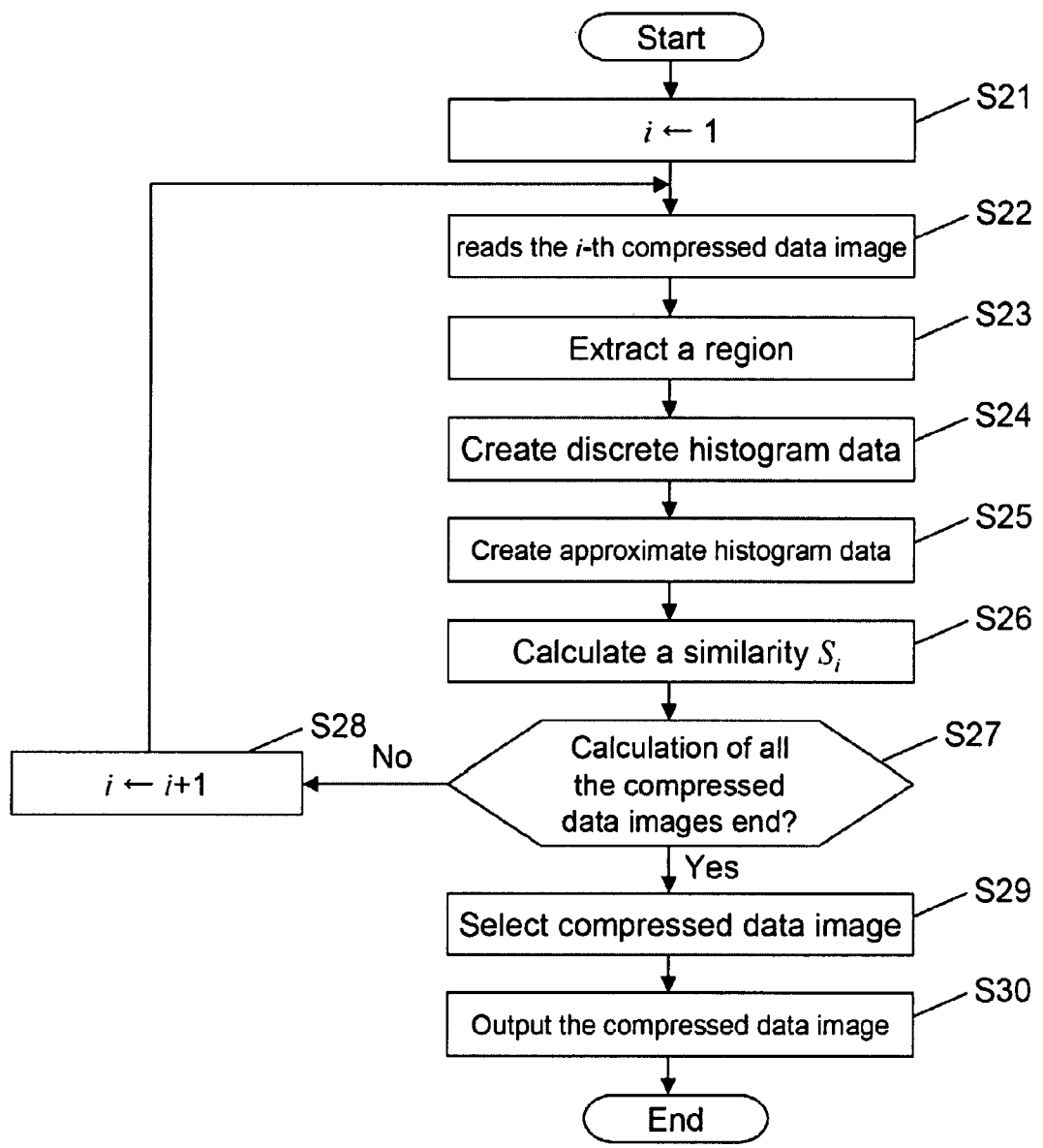
FIG. 18 is a flowchart showing the flow of coarse search processing.

FIG. 18 is a flowchart showing the flow of the coarse search processing. First, the coarse search device 34 initializes a number i of the compressed data image read from the image DB 5 to 1 (S21).

Subsequently, the region extracting means 47 reads the i-th compressed data image from the image DB 5 (S22). Further, the region extracting means 47 extracts a predetermined region (region compressed data image) from the read compressed data image (S23). Herein, the extracted region is a part of the compressed image or the entire compressed image depending on the purpose. The extracted region compressed data image is stored in the region compressed image storing means 51.

Subsequently, the discrete-histogram creating means 52 creates discrete histogram data from the region compressed data image stored in the region compressed image storing means 51 (S24).

Figure 19:
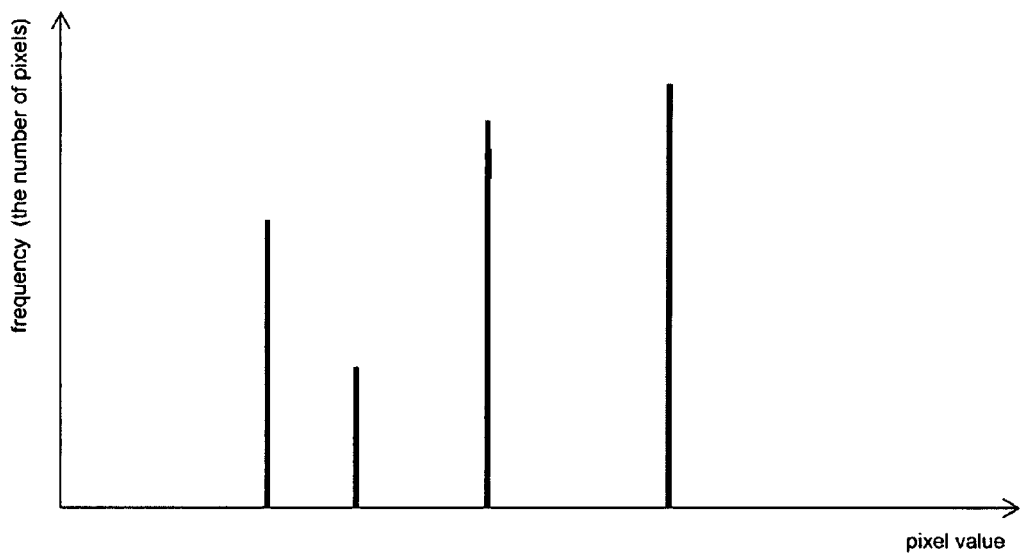
FIG. 19 is a discrete histogram created from a region compressed data image.

FIG. 19 shows a discrete histogram created from the region compressed data image. Referring to FIG. 19, the abscissa denotes a pixel value (luminance), and the ordinate denotes the appearance frequency of pixel. The appearance frequency of pixel is the sum of run lengths at the length having the same pixel value. For example, the appearance frequency of pixel of a pixel value 70 is the sum of the run lengths of data having the pixel value 70 picked-up from the entire region compressed data image. In the region compressed data image, a set of rungs having a pixel value $C_i$ is designated by $L(C_i)$. In generally, the reference histogram is expressed by the following expression (16). Herein, $L_i$ denotes a degree of pixel value (sum of run lengths), and M denotes the number of pixel values.

[Expression 13]

$$S_i = \int |H_i(x) - H_0(x)| dx = \sum_{x_i} |H_i(x_i) - H_0(x_i)| \quad (16)$$

Incidentally, the appearance frequency of pixel may be expressed by a standard value obtained by dividing the degree of the pixel value by the total of pixels on one screen.

Subsequently, the approximate-histogram creating means 53 allows the discrete histogram data output by the region compressed image storing means 51 to have the distribution of degrees of pixel values, thereby creating approximate histogram data (S25).

The pixel value $C_i$ of the pixel value histogram shown in FIG. 19 is a quantized value and pixels can be distributed near the pixel value $C_i$ in the original image. Then, it is assumed that the pixels are distributed within a normal distribution with the pixel value $C_i$ as center, and a degree $L_i$ of the degree of pixel value $C_i$ is distributed near the pixel value $C_i$ in accordance with a distribution function G(x) expressed by the following expression (17). Herein, x denotes the pixel value, and a denotes a standard deviation.

[Expression 14]

$$G(x) = \frac{L_i}{\sqrt{2\pi}\,\sigma} \exp\left(-\frac{(x - C_i)^2}{2\sigma^2}\right) \quad (17)$$

Figure 20:
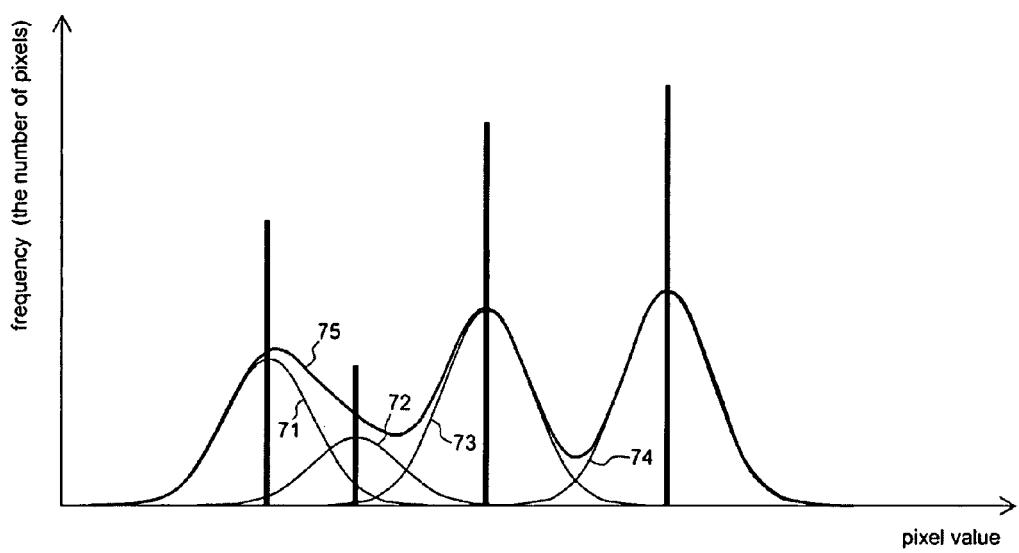
FIG. 20 is a histogram showing pixels distributing near a pixel value $C_i$ and a histogram obtained by combining the pixels.
Figure 21:
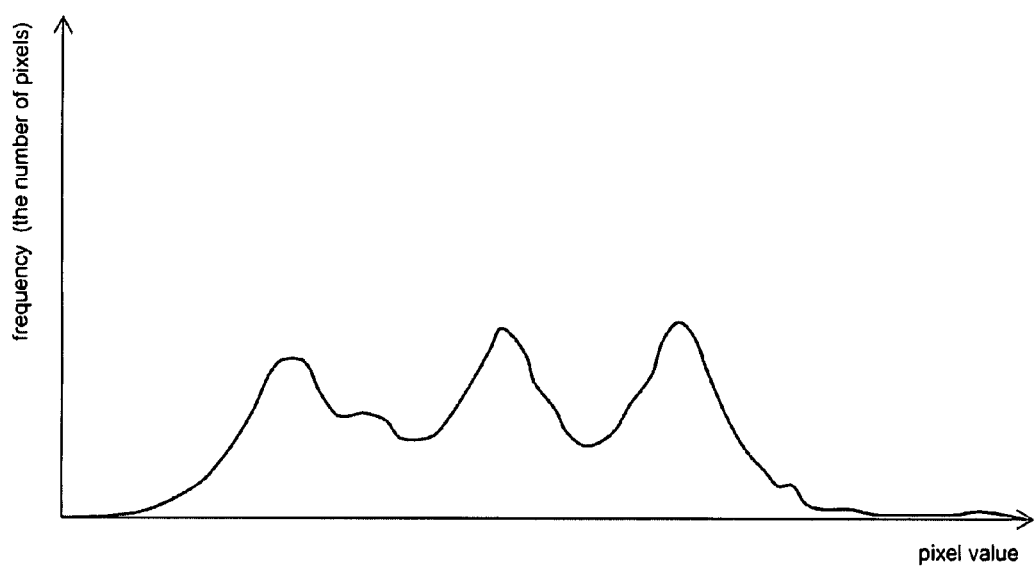
FIG. 21 is a histogram of an original image.

For the entire pixel value $C_i$ of the discrete pixel value histogram, the degree $L_i$ of pixel value is distributed near the pixel value $C_i$ on the basis of the expression (17). Then, referring to FIG. 20, histogram 71 to 74 showing pixels distributed near the pixel value $C_i$ are drawn. Herein, as the standard deviation σ, ¼ ($C_i$/4) of the pixel value $C_i$ is selected, thereby obtaining a good result. Finally, all the histograms are superimposed, thereby obtaining a continuous approximate histogram 75 of all pixel values.

Subsequently, the comparing and calculating means 48 calculates a similarity $S_i$ between the approximate histogram data output from the approximate-histogram creating means 53 and the reference histogram data stored in the reference-histogram storing means 46 (S26). The similarity $S_i$ is calculated by the difference between the approximate histogram data and the reference histogram data. That is, the approximate histogram data is designated by $H_i(x)$, and the reference histogram data is designated by $H_0(x)$. Then, the similarity $S_i$ is expressed by the following expression (18) wherein x and $x_i$ denote pixel values.

[Expression 15]

$$S_i = \int |H_i(x) - H_0(x)| dx = \sum_{x_i} |H_i(x_i) - H_0(x_i)| \quad (18)$$

Subsequently, the image search apparatus 1 determines whether or not the calculation of the similarity $S_i$ ends with respect to all the compressed data images stored in the image DB 5 (S27). If NO in S27, the number i is incremented by 1 (S28), and the processing returns to that in step S22.

If it is determined n step S27 that the calculation of the similarity $S_i$ ends with respect to all the compressed data images, the image selecting means 49 selects one or a plurality of compressed data images similar to the reference image on the basis of the similarity of the compressed data image (S29), outputs the selected image as the candidate image (S30), and ends the image search processing.

Incidentally, the method for selecting the compressed data image by using the image selecting means 49 can include a method for selecting the compressed data image having the minimum similarity $S_i$ and a method for selecting all compressed data images having the similarity $S_i$ not more than a predetermined threshold. The use of any of the methods may be determined depending on the using purpose.

As mentioned above, the coarse search device 31 can obtain the similarity between the approximate histogram data approximately restored directly from the compressed data image and the reference histogram data of the reference image, and can search for the image. The histogram of the image has an extremely small amount of data, as compared with raw image data. Therefore, as compared with the case of directly searching for the image data, the data can be searched at the higher speed by ten times or more.

As disclosed in Patent Document 2 and Non-Patent Document 1, the pixel value of the pixel of the original image is quantized and the run length is determined that the distribution of the pixel value of the original image corresponding to the run has the predetermined threshold F. Thus, in the case of approximately restoring the pixel value histogram of the image data that is run-length encoded, the square of the threshold $\Gamma$ can be set as the standard deviation $\sigma$.

Alternatively, a smaller value of the square of the threshold $\Gamma$ and $\frac{1}{4}$ ($C_i/4$) of the pixel value $C_i$ can be set as the standard deviation $\sigma$.

[2] Extract Candidate Image that is the Most Similar to the Reference Image

The coarse search device 31 extracts the candidate image as mentioned above. Subsequently, the matching device 38 extracts the candidate image that is the most similar to the reference image as follows.

That is, first, as pre-processing, the image encoding device 35 encodes the reference image stored in the region image storing means 33. Herein, as the encoding method, the same encoding method as the encoding method used for encoding the compressed data image stored in the image DB 5 is used. The candidate image encoded by the image encoding device 35 is stored to the candidate-image storing means 36.

FIG. 22 is a flowchart showing the flow of matching processing by the matching device 38.

First, in step S41, the edge extracting means 63 reads the compressed reference image from the compressed image storing means 36.

Subsequently, in step S42, the edge extracting means 63 analyzes the compressed reference image, and creates a set $\{Chq_i | i=1, 2, \ldots, N\}$ of the feature points of the reference image. Herein, the feature point $Cqh_i$ is a point on the one-dimensional plane ($Cqh_i \in R$).

Subsequently, in step S43, the pairing means 6 rearranges the feature point $Cqh_i$ ($i=1, 2, \ldots, N$) on the Hilbert curve, and obtains a set $\{u_j | j=1, 2, \ldots, N; u_1 \leq u_2 \leq \ldots \leq u_N\}$ of the coordinates of the feature points on the Hilbert curve.

Subsequently, in step S44, the edge extracting means 61 reads one of the compressed candidate images stored in the candidate-image storing means 37. Further, in step S45, the edge extracting means 61 analyzes the compressed candidate image, and creates a set $\{v_k | k=1, 2, \ldots, N'; v_1 \leq v_2 \leq \ldots \leq v_{N'}\}$ of the coordinates of the feature points of the candidate image.

Subsequently, in step S46, the pairing means 65 obtains a data element $v_{1(j)}$ of a set $\{v_k | k=1, 2, \ldots, N'; v_j \leq v_j \leq \ldots \leq v_{N'}\}$ of the coordinates of the feature points of the candidate image satisfying the following expression (19) with respect to the data element $u_j$ belonging to the set $\{u_j | l=1, 2, \ldots, N; u_1 \leq u_2 \leq \ldots \leq u_N\}$ of the coordinates of the feature points of the reference image. Further, a pair set $\{(u_j, v_{1(j)}) | j=1, 2, \ldots, N\}$ of $u_j$ and $v_{1(j)}$ is created.

[Expression 16]

$$\|u_j - v_{1(j)}\| = \min\{\|u_j - v_1\|, \|u_j - v_2\|, \ldots, \|u_j - v_N\|\} \quad (19)$$

Subsequently, in step S47, the pair extracting means 67 extracts P (wherein P is a natural number satisfying a relation of P<N) data elements in small order of the pair distance $\|u_j - v_{1(j)}\|$ from among the pair set $\{(u_j, v_{1(j)}) | j=1, 2, \ldots, N\}$, and creates a partial pair set $\{(u_m, v_{1(m)}) | m=1, 2, \ldots, P\}$ of the feature points.

Subsequently, in step S48, the rating-scale calculating means 68 calculates the Hirbert scanning distance as the rating scale by the expression (4).

Subsequently, in step S49, all candidate images are read. If the average value is calculated, the processing advances to step S50. If not so, the processing returns to step S44.

Finally, in step S50, the determining means 69 calculates the Hirbert scanning distances of all candidate images, and determines that the candidate image having the minimum Hirbert scanning distance is a candidate image that is the most approximate to the reference image. Further, the image output means 10 outputs the determined candidate image.

As mentioned above, according to the third embodiment, as the pre-processing of execution of the matching processing, the coarse search device 34 narrows the candidate images by the coarse search with the histogram, thereby extracting the image that is the most similar to the reference image at high speed from among a large number of the image data in the image DB 5.

The invention claimed is:

1. A matching apparatus for comparing a reference object with a compared object and determining similarity between both the objects, comprising:
   mapping means that maps feature points extracted from the objects to a one-dimensional space by bijection for developing data elements of the objects on the one-dimensional space;
   pairing means that searches for a feature point of the compared object existing the most nearest to a feature point of the reference object on the one-dimensional space and creates a pair set of pairs of the feature point of the reference object and the feature points of the compared object;
   pair extracting means that creates a partial pair set obtained by partly extracting the pairs from the pair set in small order of a pair distance between the feature points forming the pair;
   rating-scale calculating means that calculates a rating scale between the reference object and the compared object on the basis of the pair distance of the pair belonging to the partial pair set; and
   determining means that determines similarity between the reference object and the compared object on the basis of the rating scale, wherein
   the pair extracting means creates a partial pair set obtained by extracting the pair having the pair distance not more than a predetermined threshold from the pair set, and
   the rating-scale calculating means calculates a sum S1 of the pair distance of the pair belonging to the partial pair set, further calculates a value S2 obtained by multiplying a predetermined weight value to the number of pairs non-belonging to the partial pair set, and divides a sum S1+S2 of the sum S1 and the value S2 by the total number of pairs in the pair set, thereby calculating the rating scale.

2. The matching apparatus according to claim 1, wherein the mapping means maps the feature point on a space filling curve passing through all data elements of the objects.

3. The matching apparatus according to claim 2, wherein the space filling curve is Hilbert curve.

4. The matching apparatus according to claim 1, wherein the object is an image.

5. The matching apparatus according to claim 4, wherein the feature point is an edge point.

6. An image search system comprising:

an image database that stores compressed image data comprising a plurality of pieces of image data of a compressed image obtained by quantizing and run-length encoding pixel values of pixels of original image data; and reference-histogram storing means that stores reference histogram data comprising pixel value histogram data of a reference image, the image search system searches for the compressed image data stored in the image database that is similar to the reference image from among the compressed image data, the image search system further comprising:

discrete-histogram creating means that creates discrete histogram data by calculating a total degree of pixel value, $L_i$, of run lengths corresponding to a pixel value $C_i$, wherein i=1, 2, ..., M, and M is a total number of pixel values included in the compressed image data of the compressed image data stored in the image database, at an entire region or a specific partial region of the compressed image data from among the pixel values;

approximate-histogram creating means that creates approximate histogram data approximately expressing an appearance frequency of the pixel value of original image data by distributing the degree $L_i$ of pixel value of the discrete histogram data corresponding to the pixel value $C_i$ of the compressed image data to a degree $L(x)$ of pixel value of a pixel value x approximate to the pixel value $C_i$ so as to have a normal distribution of a standard deviation s with the pixel value $C_i$ as center;

similarity calculating means that calculates a similarity between the approximate histogram data and the reference histogram data stored in the reference-histogram storing means;

image selecting means that selects one or a plurality of compressed image data similar to the reference image on the basis of similarity of the compressed image data;

first feature-point extracting means that sets one or a plurality of the compressed image data selected by the image selecting means as the compressed image data of a candidate image, extracts a feature point of the candidate image on the basis of the compressed image data of the candidate image, and calculates coordinates of the feature point on a one-dimensional space;

second feature-point extracting means that extracts a feature point of the reference image and calculates coordinates of the feature point on the one-dimensional space;

pairing means that searches for a feature point of the candidate image that is most approximate to the feature point of the reference image on the one-dimensional space, and creates a set of pairs of the feature point of the reference image and of the feature point of the candidate image;

pair extracting means that creates a partial pair set obtained by extracting a part of the pairs in small order of a pair distance between both the feature points of the pair from among the pair set;

rating-scale calculating means that calculates a rating scale between the reference image and the candidate image on the basis of the pair distance of the pair belonging to the partial pair set; and determining means that determines the similarity between the reference image and the candidate image on the basis of the rating scale, wherein the pair extracting means creates a partial pair set obtained by extracting the pair having the pair distance not more than a predetermined threshold from the pair set, and the rating-scale calculating means calculates a sum S1 of the pair distance of the pair belonging to the partial pair set, further calculates a value S2 obtained by multiplying a predetermined weight value to the number of pairs non-belonging to the partial pair set, and divides a sum S1+S2 of the sum S1 and the value S2 by the total number of pairs in the pair set, thereby calculating the rating scale.

7. The image search system according to claim 6, wherein the similarity calculating means calculates the difference between the approximate histogram data and the reference histogram data as the similarity.

8. A matching method for comparing a reference object with a compared object and determining similarity between both the objects, wherein the method is implementable on a computer including a processor programmed with computer readable code, the method comprising:

mapping, with the processor, a feature point extracted from the objects by bijection for developing data elements of the objects on a one-dimensional space to the one-dimensional space;

searching, with the processor, for a feature point of the compared object that is the most approximate to a feature point of the reference object on the one-dimensional space, and creating a pair set of the feature point of the reference object and the feature point of the compared object;

creating, with the processor, a partial pair set obtained by extracting a part of the pairs in small order of a pair distance between both the feature points of a pair from among the pair set;

calculating, with the processor, a rating scale between a reference image and a candidate image on the basis of the pair distance of a pair belonging to the partial pair set; and determining, with the processor, similarity between the reference image, wherein in the step of creating, a pair extracting means creates a partial pair set obtained by extracting the pair having the pair distance not more than a predetermined threshold from the pair set, and in the step of calculating, a rating-scale calculating means calculates a sum S1 of the pair distance of the pair belonging to the partial pair set, further calculates a value S2 obtained by multiplying a predetermined weight value to the number of pairs non-belonging to the partial pair set, and divides a sum S1+S2 of the sum S1 and the value S2 by the total number of pairs in the pair set, thereby calculating the rating scale.

9. An image search method of a system, the system including a computer having a processor programmed with computer readable code, comprising:

with the processor, storing compressed image data comprising a plurality of pieces of image data of a compressed image obtained by quantizing and run-length encoding pixel values of pixels of original image data in an image database; and with the processor, storing reference histogram data comprising pixel value histogram data of a reference image in a reference-histogram storing means, the image search method for searching for the compressed image data stored in the image database that is similar to the reference image from among the compressed image data, comprising:

a discrete-histogram creating step of creating, with the processor, discrete histogram data by calculating a total degree of pixel value, $L_i$, of run lengths corresponding to a pixel value $C_i$, where i=1, 2, ..., M, and M is a total number of pixel values included in the compressed image data, of the compressed image data stored in the image database, at an entire region or a specific partial region of the compressed image data from among the pixel values;

an approximate-histogram creating step of creating, with the processor, approximate histogram data approximately expressing appearance frequency of the pixel value of the original image data by distributing the degree $L_i$ of pixel value of discrete histogram data corresponding to the pixel value $C_i$ of the compressed image data to a degree $L(x)$ of pixel value of a pixel value x approximate to the pixel value $C_i$ so as to have a normal distribution of a standard deviation s with the pixel value $C_i$ as center;

a similarity calculating step of calculating, with the processor, similarity between the approximate histogram data and the reference histogram data stored in the reference-histogram storing means;

an image selecting step of selecting, with the processor, one or a plurality of the compressed image data similar to the reference image on the basis of similarity of the compressed image data;

a first feature-point extracting step of setting, with the processor, one or a plurality of the compressed image data selected by the image selecting step as the compressed image data of a candidate image, extracting a feature point of the candidate image on the basis of the compressed image data of the candidate image, and calculating coordinates of the feature point on a one-dimensional space;

a second feature-point extracting step of extracting, with the processor, a feature point of the reference image and calculating coordinates of the feature point on the one-dimensional space;

a pairing step of searching, with the processor, for the feature point of the candidate image that is most approximate to the feature point of the reference image on the one-dimensional space, and creating a set of pairs of the feature point of the reference image and of the feature point of the candidate image;

a pair extracting step of creating, with the processor, a partial pair set obtained by extracting a part of the pairs in small order of a pair distance between both the feature points of the pair from among the pair set;

a rating-scale calculating step of calculating, with the processor, a rating scale between the reference image and the candidate image on the basis of the pair distance of the pair belonging to the partial pair set; and a determining step of determining, with the processor, similarity between the reference image and the candidate image on the basis of the rating scale, wherein in the step of creating, a pair extracting means creates a partial pair set obtained by extracting the pair having the pair distance not more than a predetermined threshold from the pair set, and in the step of calculating, a rating-scale calculating means calculates a sum S1 of the pair distance of the pair belonging to the partial pair set, further calculates a value S2 obtained by multiplying a predetermined weight value to the number of pairs non-belonging to the partial pair set, and divides a sum S1+S2 of the sum 51 and the value S2 by the total number of pairs in the pair set, thereby calculating the rating scale.

10. A non-transitory computer readable storage medium including a computer readable program enabling a computer to function as the matching apparatus according to claim 1 by reading the program to the computer and executing the program.

11. A non-transitory computer readable storage medium including a computer readable program for enabling a computer to function as the image search system according to claim 6 by reading the program to the computer and executing the program.

12. A non-transitory computer readable storage medium including a computer readable program for enabling a computer to function as the matching apparatus according to claim 2 by reading the program to the computer and executing the program.

13. A non-transitory computer readable storage medium including a computer readable program for enabling a computer to function as the matching apparatus according to claim 3 by reading the program to the computer and executing the program.

14. A non-transitory computer readable storage medium including a computer readable program for enabling a computer to function as the matching apparatus according to claim 4 by reading the program to the computer and executing the program.

15. A non-transitory computer readable storage medium including a computer readable program for enabling a computer to function as the matching apparatus according to claim 5 by reading the program to the computer and executing the program.

16. A non-transitory computer readable storage medium including a computer readable program for enabling a computer to function as the image search system according to claim 7 by reading the program to the computer and executing the program.

* * * * *